United States Patent [19]

Kurosu

[11] Patent Number: 5,123,005
[45] Date of Patent: Jun. 16, 1992

[54] DISC TRAY LOADING MECHANISM FOR REDUCING LOADING AND UNLOADING MECHANICAL SHOCKS

[75] Inventor: Tadao Kurosu, Saitama, Japan

[73] Assignee: Sony Corporation, Japan

[21] Appl. No.: 629,682

[22] Filed: Dec. 18, 1990

[30] Foreign Application Priority Data

Dec. 28, 1989 [JP] Japan .................... 1-343299

[51] Int. Cl.⁵ .................... G11B 17/26; G11B 17/04
[52] U.S. Cl. .................... 369/77.1; 369/37; 369/75.2; 360/99.02; 360/99.07
[58] Field of Search .................... 369/75.2, 77.1, 77.2, 369/37, 79; 360/99.02, 99.03, 99.06, 99.07, 98.06, 98.01

[56] References Cited

U.S. PATENT DOCUMENTS

| | | | |
|---|---|---|---|
| 4,184,185 | 1/1980 | Yakame | 360/137 |
| 4,425,591 | 1/1984 | Ito et al. | 360/88 |
| 4,698,704 | 10/1987 | Koizumi et al. | 360/74.1 |
| 4,755,978 | 7/1988 | Takizawa et al. | 369/37 |
| 4,893,295 | 1/1990 | Matsuura et al. | 369/75.2 |

*Primary Examiner*—Stuart S. Levy
*Assistant Examiner*—Joseph A. Rhoa
*Attorney, Agent, or Firm*—Ronald P. Kananen

[57] ABSTRACT

A loading mechanism of a disc tray onto which recording medium discs such as compact discs, laser discs, or the like are set and which moves between a pull-out position at which the disc tray was pulled out of an outer casing and a pull-in position at which the disc tray was pulled into the outer casing. The engagement between the loading gear and the rack of the disc tray is released just before the pull-in operation of the disc tray is completed and, at the same time, a cam portion formed on the loading gear comes into engagement with the abutted portion of the disc tray, thereby allowing the disc tray to be subsequently pulled in by the pressing motion of the cam portion to the abutted portion. Thus, the pull-in speed of the disc tray can be reduced just before the completion of the pull-in operation of the disc tray and a shock which occurs upon completion of the pull-in operation of the disc tray can be reduced. Due to this, a shock sound by the collision of the disc tray and the member on the casing side for restricting the pull-in position of the disc tray and the shock to the disc player by such a collision are eliminated, thereby raising the quality of the disc player.

6 Claims, 21 Drawing Sheets

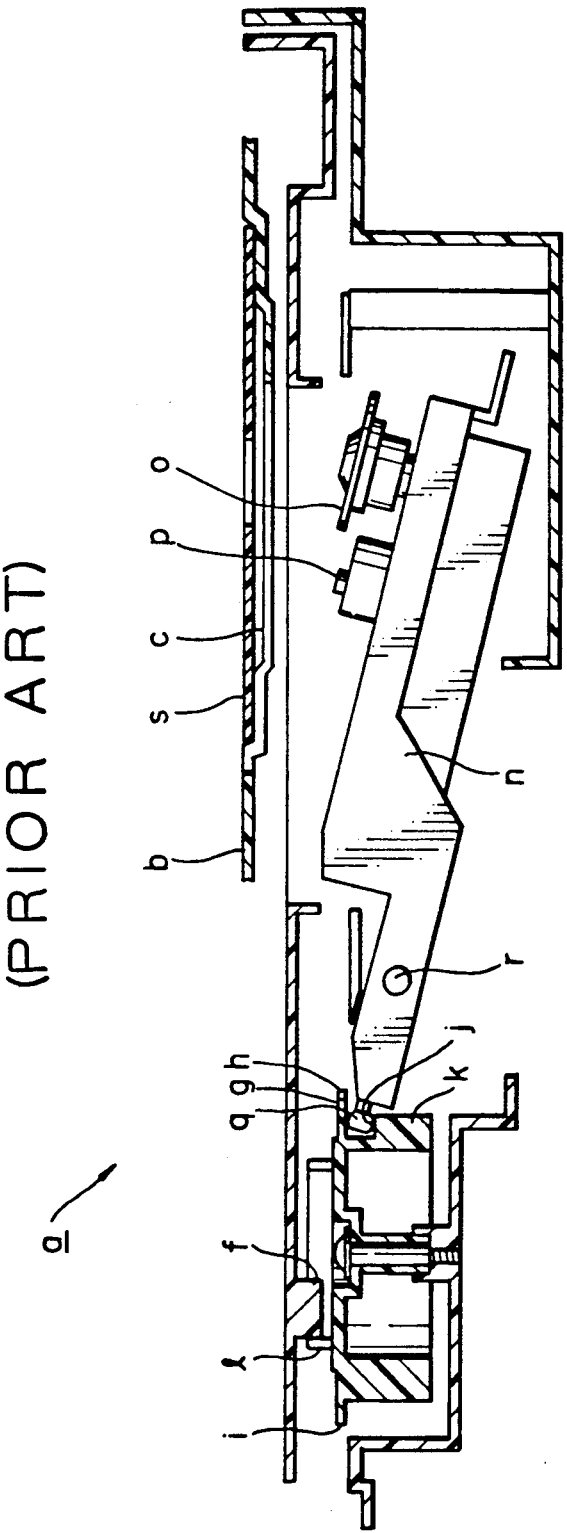

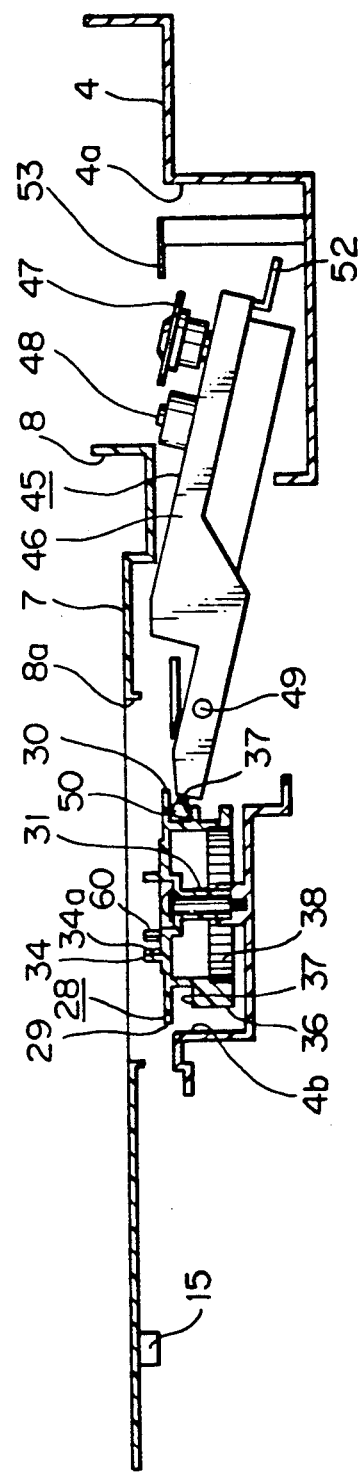

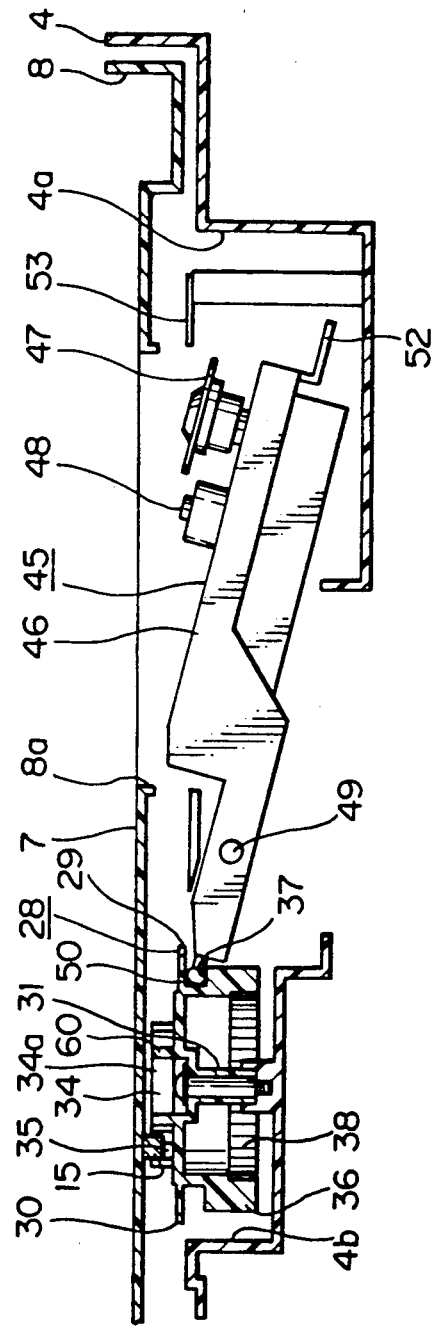

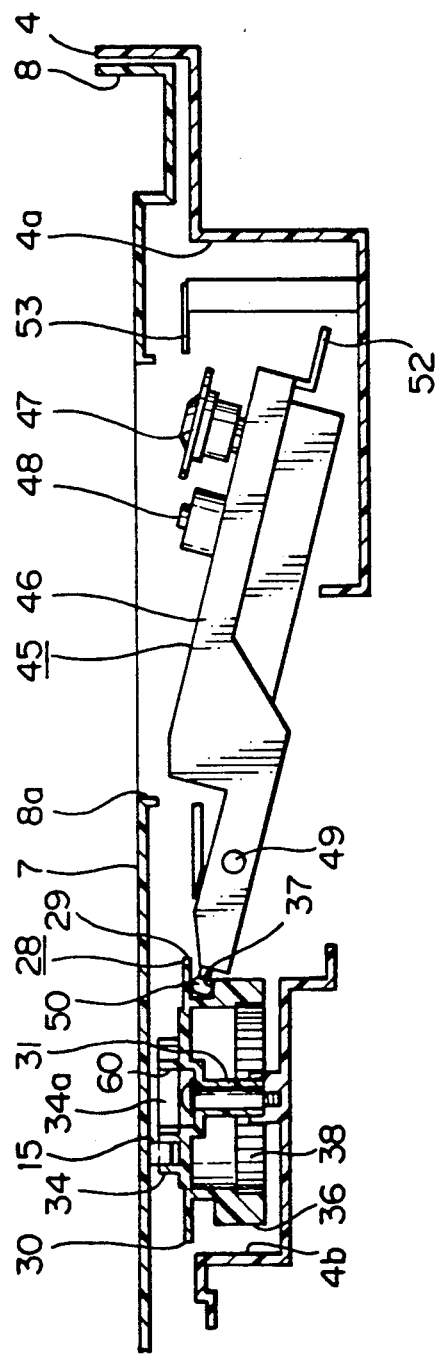

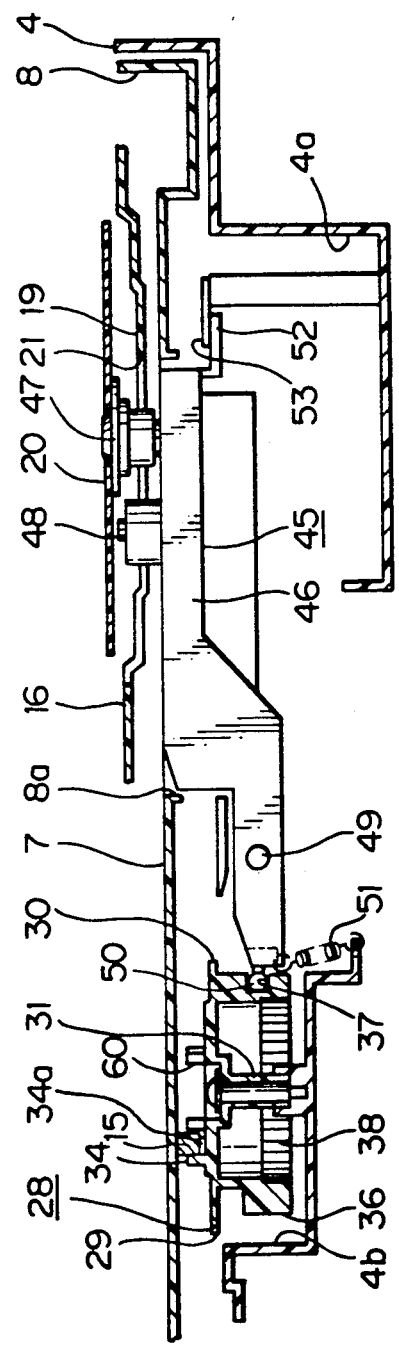

DISC TRAY LOADING MECHANISM FOR REDUCING LOADING AND UNLOADING MECHANICAL SHOCKS

BACKGROUND OF THE INVENTION

1. Field of the Invention

The invention relates to a novel disc tray loading mechanism. More particularly, the invention relates to a loading mechanism of a disc tray onto which recording medium discs such as compact discs, laser discs, or the like are set and which moves between a pull-out position at which the disc tray is pulled out of an outer casing and a pull-in position at which the disc tray is pulled into the outer casing.

2. Description of the Prior Art

There is a disc player using a known disc tray loading mechanism known as a linear skating type in which a tray on which a recording medium disc is set is pulled into the casing of the player substantially in a horizontal direction.

In a disc player of the type mentioned above, since a chucking of the recording medium disc is executed after completion of the loading of the disc tray, it is necessary to raise the disc tray or to lower the mechanical deck.

The tray loading mechanism of such a linear skating type executes the pull-in of the disc tray into the casing and the lowering operation of the disc tray or the raising operation of the mechanical deck by a single driving source.

Therefore, a tooth portion and a notched tooth portion are formed on a loading gear which comes into engagement with the rack formed on the disc tray. When the tooth portion is in engagement with the rack of the disc tray, the disc tray is moved in the horizontal direction. When the engagement between the rack of the disc tray and the loading gear is released by the notched tooth portion, the disc tray is descends or the mechanical deck is ascends.

FIGS. 1 and 2 show main sections of a disc tray loading mechanism a of the linear skating type in which the chucking of a recording medium disc is executed by raising a mechanical deck for the disc tray.

b denotes a thin box-shaped disc tray whose lower surface is open to the outside. A planar circular flat disc setting concave portion c is formed on the rear side of the disc tray b. The disc tray b is movable between a pull-in position at which the disc tray is supported by a guide portion of a casing (not shown) and is pulled into the casing and a pull-out position at which almost all of the disc tray is pulled out of the casing.

d indicates a rack which is integratedly formed on the lower surface of the disc tray b so as to extend in the moving direction and which is formed with a tooth portion on the left side surface. The rack d come into engagement with a loading gear, which will be explained hereinafter, and pulls out and in the disc tray b by a rotation of the, loading gear.

e denotes abutting members (only one is shown) which are formed on each side of the disc tray b side and restrict the pull-in position of the disc tray b. The abutting members e are vertically formed on the lower surface on this side of the disc tray b. A position where the abutting members e abut against a stopper member, which will be explained hereinafter, is set to the pull-in position.

f represents an abutted member on the disc tray b side for holding the disc tray b at the pull-in position. The abutted member f is vertically formed on the lower surface of the disc tray b and in the portion located above a loading gear, which will be explained hereinafter, at the pull-in position of the disc tray.

g denotes a loading gear which is rotatably supported on this side in the bottom plate of the casing and is rotated by a driving source (not shown). The loading gear has a flat gear shape and has a tooth portion h in which gear teeth are formed over almost 210° of the peripheral edge of the loading gear and a remaining notched tooth portion i in which no gear teeth are formed.

j denotes a cam cylinder formed on the lower surface of the loading gear h and concentrically arranged therewith. A cam groove k is formed on the peripheral surface of the cam cylinder j.

l denotes a pull-in state holding member formed on the upper surface of the loading gear g. The holding member l is formed concentrically with the loading gear g so as to have an arc shape whose center span angle is set to about 165° when it is seen as flat plane. On the other hand, a clockwise side edge of the pull-in state holding member l when it is seen from above and a counterclockwise side edge of the tooth portion h are separated from each other by an angle of about 110° as a center angle.

On the other hand, for the cam groove k, the portion located below the tooth portion h of the loading gear g is formed in the upper portion of the cam cylinder j almost horizontally and the portion locating below the notched tooth portion i of the loading gear g is formed so as to be deviated to the lower side as it approaches the clockwise side.

m denotes a stopper member which is projected at a position close to this side of the bottom plate of the casing. When the disc tray b comes to the pull-in position, the abutting member e abuts against the stopper member m, thereby blocking the disc tray b from being further pulled in.

n denotes a mechanical deck arranged behind the loading gear g in the casing. A turn table o is rotatably supported on the rear edge portion of the mechanical deck n and a pickup p is supported on the front side of the turn table o so as to be movable in the front/rear direction. On the other hand, an engaging member q is formed in the front edge potion of the mechanical deck n.

The mechanical deck n is rotatably supported to a supporting shaft r which is fixed to the casing in a manner such that the front position of the portion to which the pickup p is supported extends in the right/left direction. Both of the front and rear edges of the mechanical deck n vertically swing like a seesaw. The engaging member q is slidably engaged with the cam groove k of the cam cylinder j of the loading gear g. When the engaging position of the cam groove k is low, the mechanical deck n is set into an almost horizontal state. The turn table o and the pickup p are located so as to be slightly projected to the upper position from the bottom surface of the disc setting concave portion c of the disc tray b. On the other hand, when the engaging position with the cam groove k is high, the mechanical deck n is obliquely positioned so that the rear edge is set at a lower position.

When the mechanical deck n is moved into the horizontal state and the turn table o and the pickup p are slightly projected from the bottom surface of the disc setting concave portion c, a disc s placed on the disc setting concave portion c is chucked by the turn table o. On the other hand, when the mechanical deck n is inclined, the chucking of the disc s is cancelled disengaged and the disc s is again set onto the disc setting concave portion c, so that the disc tray b can be pulled out from the casing.

The disc tray loading mechanism a as mentioned above operates in the following manner.

First, in a state in which the disc tray b is located at the pull-out position, the teeth of the rack d close to the rear edge are in engagement with the teeth of the tooth portion h of the loading gear g which are located on the counterclockwise side edge. The loading gear g rotates counterclockwise from this state, thereby moving the rack d rearwardly and pulling the disc tray b into the casing. In this state, the engaging member q of the mechanical deck n is in engagement with the upper cam groove k of the cam cylinder j, so that the mechanical deck n is held in the inclined state.

Then, the disc tray b is pulled into the casing and abutting member e abuts against the stopper member m on the casing side and, at the same time, the engagement between the tooth of the tooth portion h of the loading gear g which is located at the clockwise side edge and the tooth of the rack d which is located at the front edge is cancelled. The pull-in state holding member l of the loading gear g comes from the left side when it is seen from the front direction. The inner peripheral surface of the pull-in state holding member comes into engagement with the front edge surface of the abutted member f of the disc tray b. Thus, even if the loading gear g further rotates counterclockwise, the disc tray b does not move rearwardly. On the other hand, the disc tray b is not pulled out forwardly due to the engagement between the pull-in state holding member l and the abutted member f and is held at the pull-in position.

When the loading gear g further rotates counterclockwise from the above state, the engaging member q is guided by the cam groove k and is deviated downwardly. The mechanical deck n is set into the horizontal state and the turn table o chucks the discs, thereby obtaining a state in which the recording or reproduction can be performed.

However, in such a disc tray loading mechanism a, there are problems such that when the disc tray b reaches the pull-in position, the abutting member e abuts on the stopper member m on the casing side and a collision sound is generated and that a shock due to the collision is fairly propagated to the mechanical deck n or the circuit board or the like and an adverse influence is exerted on the disc player having an optical system.

OBJECTS AND SUMMARY OF THE INVENTION

It is, therefore, an object of the invention to provide a novel disc tray loading mechanism by improving a loading gear for pulling a disc tray into a casing, eliminating a collision sound which is normally generated upon completion of the pull-in operation of the disc tray and eliminating a shock to the disc player by such collision, thereby improving the quality of a disc player.

According to an aspect of the invention, there is provided a disc tray loading mechanism comprising: a disc tray onto which discs are detachably set and which moves between a pull-out position where the disc tray is pulled out of a casing and a pull-in position where the disc tray is pulled into the casing and which has rack extending along a moving direction; and a loading gear which is rotatably supported on the casing and has a tooth portion adapted to come into engagement with the rack of the disc tray, wherein an abutted portion is formed on a portion of the disc tray which faces the loading gear in a pull-in state of the disc tray, a pull-in state holding portion which has an arc-like shape which is concentric with the loading gear and holds the disc tray into the pull-in position by coming into engagement with the abutted portion formed on the upper surface of the loading gear, a cam portion is formed in an edge portion of the pull-in state holding portion on the side of the start of the engagement with the abutted portion, an engaging state between the loading gear and the rack is released just before completion of the pull-in of the disc tray, and at the same time, the engagement between the cam portion of the loading gear and the abutted portion of the disc tray is started, thereby executing the pull-in of the disc tray after completion of the release of the engaging state between the loading gear and the rack by a pressing motion of the cam portion to the abutted portion.

The above, and other, objects, features and advantages of the present invention will become readily apparent from the following detailed description thereof which is to be read in connection with the accompanying drawings.

BRIEF DESCRIPTION OF THE DRAWINGS

FIG. 1A is an enlarged plan view of the main section and FIG. 1B is an enlarged cross sectional view of the main section;

FIG. 12A is an enlarged plan view of a main section and where FIG. 12B is an enlarged cross sectional view of the main section;

FIG. 13A is an enlarged plan view of the main section and FIG. 13B is an enlarged cross sectional view of the main section;

FIG. 14A is an enlarged plan view of the main section and FIG. 14B is an enlarged cross sectional view of the main section;

FIG. 15A is an enlarged plan view of the main section and FIG. 15B is an enlarged cross sectional view of the main section.

DETAILED DESCRIPTION OF THE PREFERRED EMBODIMENTS

Figure 1A:
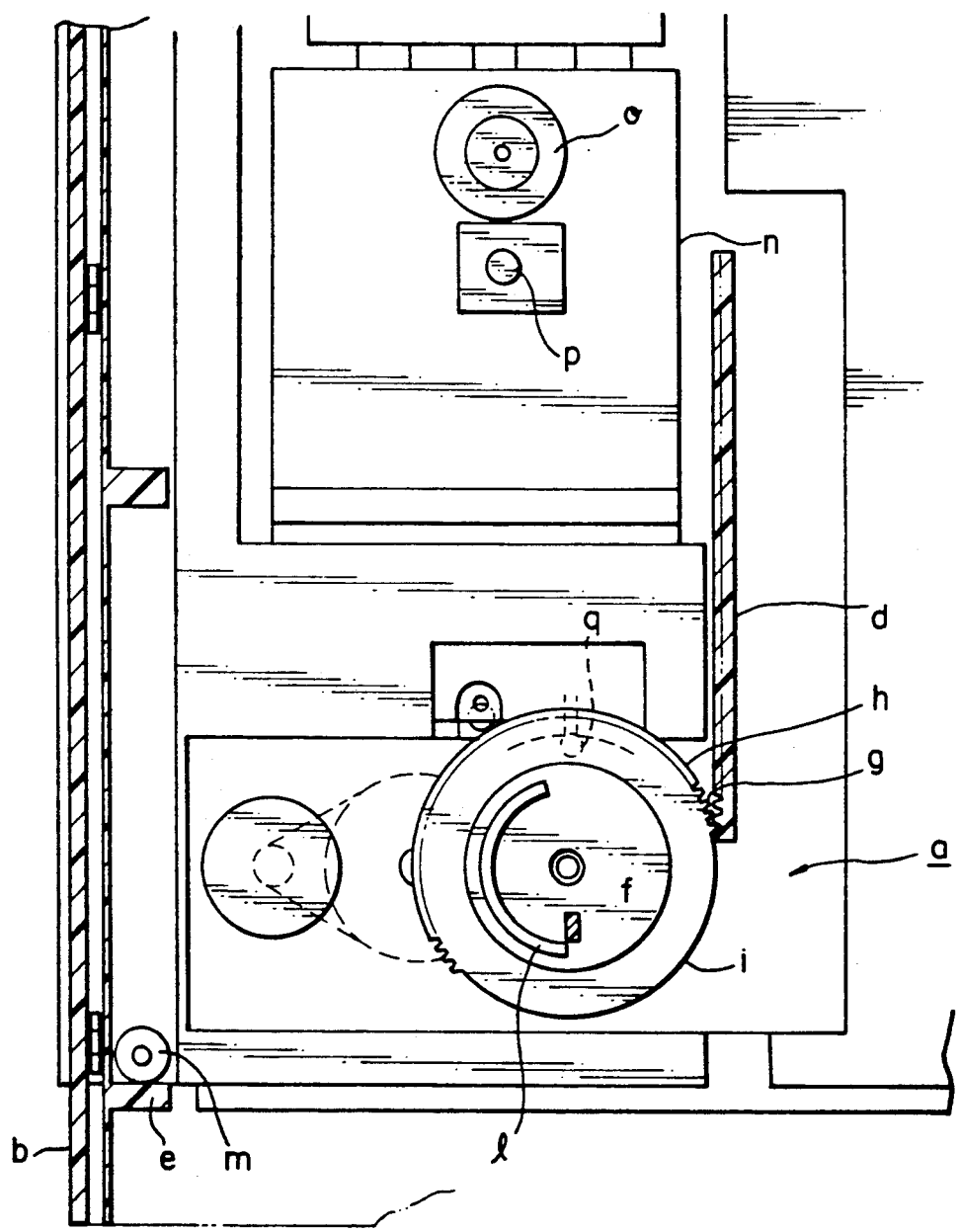
FIGS. 1A and B show the main sections of a conventional disc tray loading mechanism in the pull-in state of the disc tray where
Figure 2:
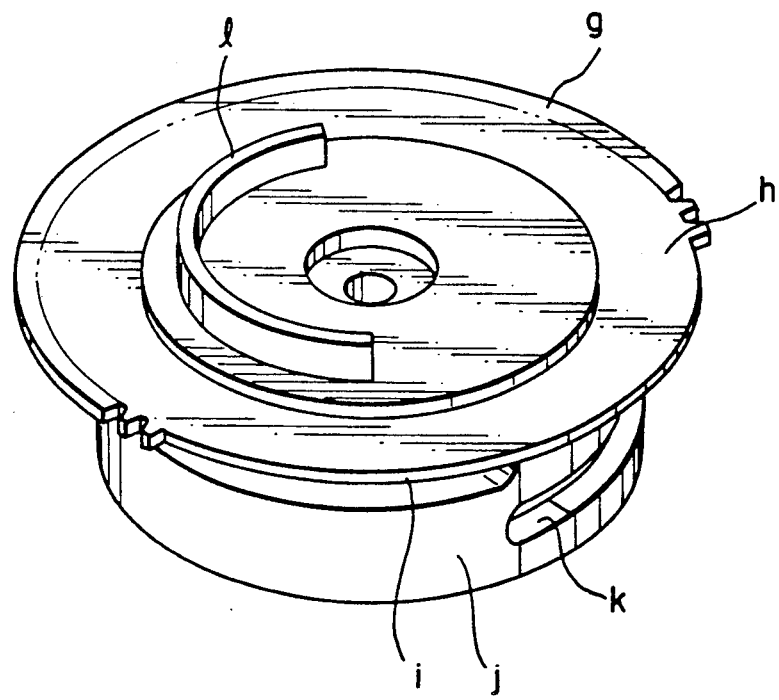
FIG. 2 is a perspective view of a loading gear of the conventional disc tray loading mechanism.

A disc tray loading mechanism of the invention will be described in detail hereinbelow in accordance with an embodiment shown in the drawings (FIGS. 3 to 16).

The embodiment shown in the drawings relates to the case where the disc tray loading mechanism of the invention is applied to a disc player of what is called an automatic changing type in which a plurality of compact discs are enclosed and one of the compact discs is selected and the reproduction is executed, wherein after completion of the pull-in operation of a disc tray, a mechanical deck is raised and the chucking of the compact disc is executed.

a. Casing (FIGS. 3 to 8)

Reference numeral 1 denotes a disc player.

Reference numeral 2 denotes an outer casing of the disc player 1. The outer casing 2 is formed into a relatively thin box shape whose lower and rear surfaces are opened. (The direction which is directed to the left oblique downward position in FIG. 3 assumes the front side and the direction which is directed to the right oblique upward position assumes the rear side. On the other hand, the direction which is directed to the left oblique upper position in the diagram assumes the left side and the direction which is directed to the right oblique lower position assumes the right side). In the following description, the conditions about the directions are used as a prerequisite.) A tray entrance/exit port 3 which is elongated in the right/left direction is formed in substantially the almost upper half portion of the front plate.

Reference numeral 4 denotes a chassis which closes the lower and rear surfaces of the outer casing 2. When the outer casing 2 is attached to the chassis 4 so as to cover the outer casing 2, the upper surface of the chassis 4 is located at substantially the same height as that of the lower side of the tray entrance/exit port 3.

On the other hand, reference numeral 4a denotes a rectangular mechanical deck arranging hole formed in the portion on the left rear side when the chassis 4 is seen as a flat plane. On the other hand, a concave portion 4b in which a loading gear, a loading motor, and the like, which will be explained hereinlater, are arranged is formed in the left front portion.

Reference numeral 5 denotes tray supporting projections. The tray supporting projections 5 are projected upwardly on an upper plate of the chassis 4 in the portions which correspond to both of the right and left edges of the tray entrance/exit port 3 so as to be separated from each other in the front/rear direction at a predetermined interval, respectively.

Reference numeral 6 denotes stopper members which are fixed to the slight inside portions of two right and left tray supporting projections 5 which are located at the frontmost positions among the tray supporting projections 5 in the front portion of the chassis 4. The stopper members 6 are made of an elastic member such as a rubber or the like and restrict the pull-in position of a slide tray, which will be explained hereinlater.

b. Slide tray (FIGS. 3 to 8)

Reference numeral 7 denotes a slide tray which is slidably supported to the chassis 4 by the tray supporting projections 5. The slide tray 7 is formed into an almost thin box-like shape having an almost square shape which is smaller than the chassis 4 by almost one rank when it is seen from the upper direction. A large circular concave portion 8 having a diameter of a length which is slightly shorter than a length of one side of the slide tray 7 is formed on the upper surface of the slide tray 7. A table supporting shaft 9 is provided so as to be upwardly projected from the center of the circular concave portion 8.

On the other hand, a rectangular notch 8a is formed in the portion on the left rear side of the bottom plate of the circular concave portion 8. When the slide tray 7 is pulled into the outer casing 2, the notch 8a faces the mechanical deck arranging hole 4a of the chassis 4, so that the turn table, pickup, and the like of mechanical deck, which will be explained hereinlater, can be projected into the circular concave portion 8.

Reference numeral 10 denotes guided grooves which are formed in both of the right and left side portions on the lower surface Of the slide tray 7 so as to extend in the front/rear direction and which are opened downwardly. Since the guided grooves 10 are slidably engaged with the tray supporting projections 5, the slide tray 7 is supported on chassis 4 so as to be slidable in the front/rear direction.

Reference numeral 11 denotes a clamping arm whose rear edge portion is supported to a rear left corner of the slide tray 7 and which extends to the right oblique front side. The clamping arm 11 is formed in almost a ⌐-shaped when it is seen from the left oblique front direction. An almost drum-shaped chucking member 12 is rotatably supported to a hole 11b formed in the front edge portion of an upper member 11a extending almost horizontally. The chucking member 12 comprises two discs and an almost donut-shaped magnet which is located between the two discs. A center of the chucking member 12 is located at a position close to the center of the circular concave portion 8 from the intermediate position between the rear left corner of the slide tray 7 and the center of the circular concave portion 8.

Figure 3:
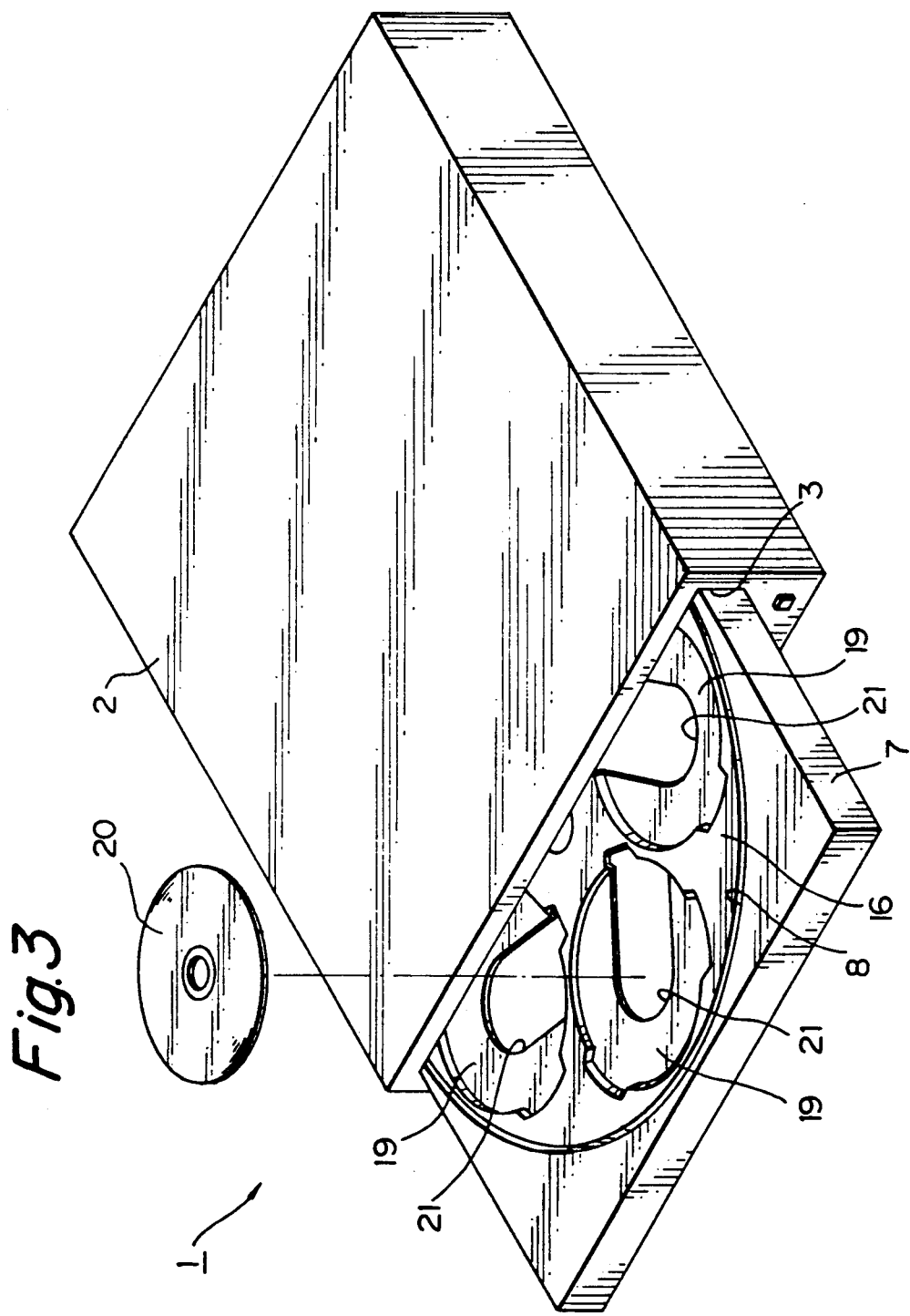
FIG. 3 is a perspective view of the whole of a disc tray loading mechanism according to an embodiment of the invention showing a state in which a slide tray was pulled out of an outer casing.
Figure 4:
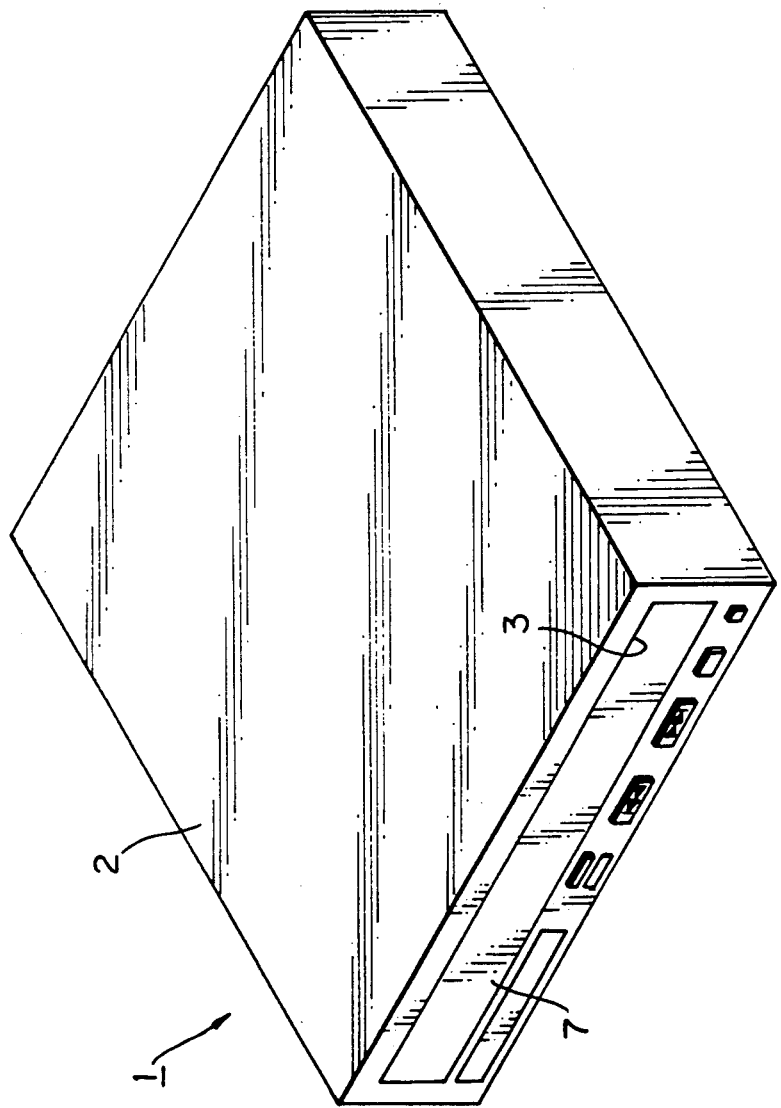
FIG. 4 is a perspective view of a whole mechanism showing a state in which the slide tray was pulled into the outer casing.

Reference numeral 13 denotes a rack fixed to an almost central portion in the right/left direction of the lower surface of the slide tray 7 so as to extend in the front/rear direction (refer to FIGS. 5 to 8). The rack 13 is located at an almost center in the front/rear direction by a length which is almost half of the length in the front/rear direction of the slide tray 7 and is formed so that the teeth are directed to the left. When the rack 13 is conveyed in the front/rear direction by the loading gear of a loading mechanism, which will be explained hereinlater, the slide tray 7 is moved in the front/rear direction. Thus, the slide tray 7 is moved between a position where the portion of about 1/3 of the slide tray which is close to the front side is projected to the outside of the outer casing 2 from the tray entrance/exit port 3 (hereinafter, such a position is referred to as a "pull-out position") as shown in FIG. 3 and by an alternate long and two short dashes line in FIG. 5 and a position where the front edge surface of the slide tray closes the tray entrance/exit port 3 (hereinafter, such a position is referred to as a "pull-in position") as shown in FIG. 4 and by a solid line in FIG. 5.

On the other hand, a gear tooth 13 located at the front edge of the rack 13 is formed larger than the other gear teeth with respect to tooth height.

Reference numeral 14 denotes abutting members which are vertically formed in both of the right and left edge portions on the front side of the lower surface of the slide tray 7. The abutting members 14 are located on the slightly inside than the guide grooves 10. When the slide tray 7 is pulled into the outer casing 2 and comes to the pull-in position, the front portions of the abutting members 14 abut on the stopper members 6 formed on the chassis 4.

Reference numeral 15 denotes an abutted member which is projected on the lower surface of the slide tray 7 at a position which is slightly away from the front edge portion of the rack 13 toward the left oblique front side. In a state in which the slide tray 7 is pulled into the outer casing, the abutted member 15 comes into engagement with the pull-in state holding member which is located above the loading gear, which will be explained hereinlater, and is formed on the upper surface of the loading gear.

C. Disc table (FIGS. 5 to 8)

Reference numeral 16 denotes a disc table which is rotatably supported to the slide tray 7.

A whole shape of the disc table 16 has an almost disc-like shape and has a diameter which is slightly smaller than the an inner diameter of the circular concave portion 8 of the slide tray 7. An almost cylindrical boss 17 is formed in the central portion of the disc table 16 so as to be projected downwardly. The table supporting shaft 9 provided for the slide tray 7 is rotatably inserted into the boss 17, so that the disc table 16 is rotatably supported to the slide tray 7 in a state in which the slide table is located in the circular concave portion 8.

On the other hand, a gear portion 18 is formed on an outer peripheral surface of the disc table 16. The gear portion 18 comes into engagement with a table driving gear, which will be explained hereinlater, thereby allowing the disc table 16 to be rotated by the rotation of the table driving gear.

The upper surface of the disc table 16 is located at an almost same height as that of the upper surface of the slide tray 7.

Reference numeral 19 denotes disc setting portions which are arranged and formed like an almost ring-shape in a region between the central portion of the upper surface of the disc table 16 and the outer edge portion thereof. The disc setting portions 19 are formed into a shallow concave shape which is almost circular when it is seen as a whole although a part of the outer periphery of each of the disc setting portions is cut away.

The disc setting portions 19 are concave portions to set discs 20 (refer to FIG. 3) called compact discs one by one. The size of each of the disc setting portions 19 is set into about a size such that the disc 20 is substantially accurately enclosed, while a depth is set to about a depth such that the disc 20 set in the disc setting portion is positioned slightly lower than the upper surface of the disc table 16.

On the other hand, in the embodiment, total five disc setting portions 19 are provided, so that up to five discs 20 can be set onto the disc table 16.

Reference numeral 21 denotes opening portions formed in the bottom portions of the disc setting portions 19. The opening portions 21 are holes for allowing parts of the discs 20 set onto the disc setting portions 19 to face the mechanical deck comprising a turn table, an optical pickup, and the like, which will be explained hereinlater. The opening portions 21 are formed so as to have an almost oval shape when they are seen from the upper direction and are formed in a direction such as to extend in the front/rear direction when the disc setting portions 19 face the mechanical deck and come to a reproducing position, which will be explained hereinlater.

d. Rotation and position control of disc table (FIGS. 5 to 8)

Reference numeral 22 denotes a table driving motor arranged at the right rear corner of the slide tray 7. An output pulley 23 is fixed to an output shaft of the table driving motor 22. An endless belt 25 extends between the output pulley 23 and a driven pulley 24 which is rotatably supported to the left side of the table driving motor 22. A table driving gear 26 is formed to the driven pulley 24 concentrically and integratedly therewith. The table driving gear 26 is in engagement with the gear portion 18 formed on the disc table 16.

When the table driving motor 22 is driven, the rotations are propagated in accordance with the order of the output pulley 23—belt 25—driven pulley 24—table driving gear 26, so that the disc table 16 is rotated.

Figure 5:
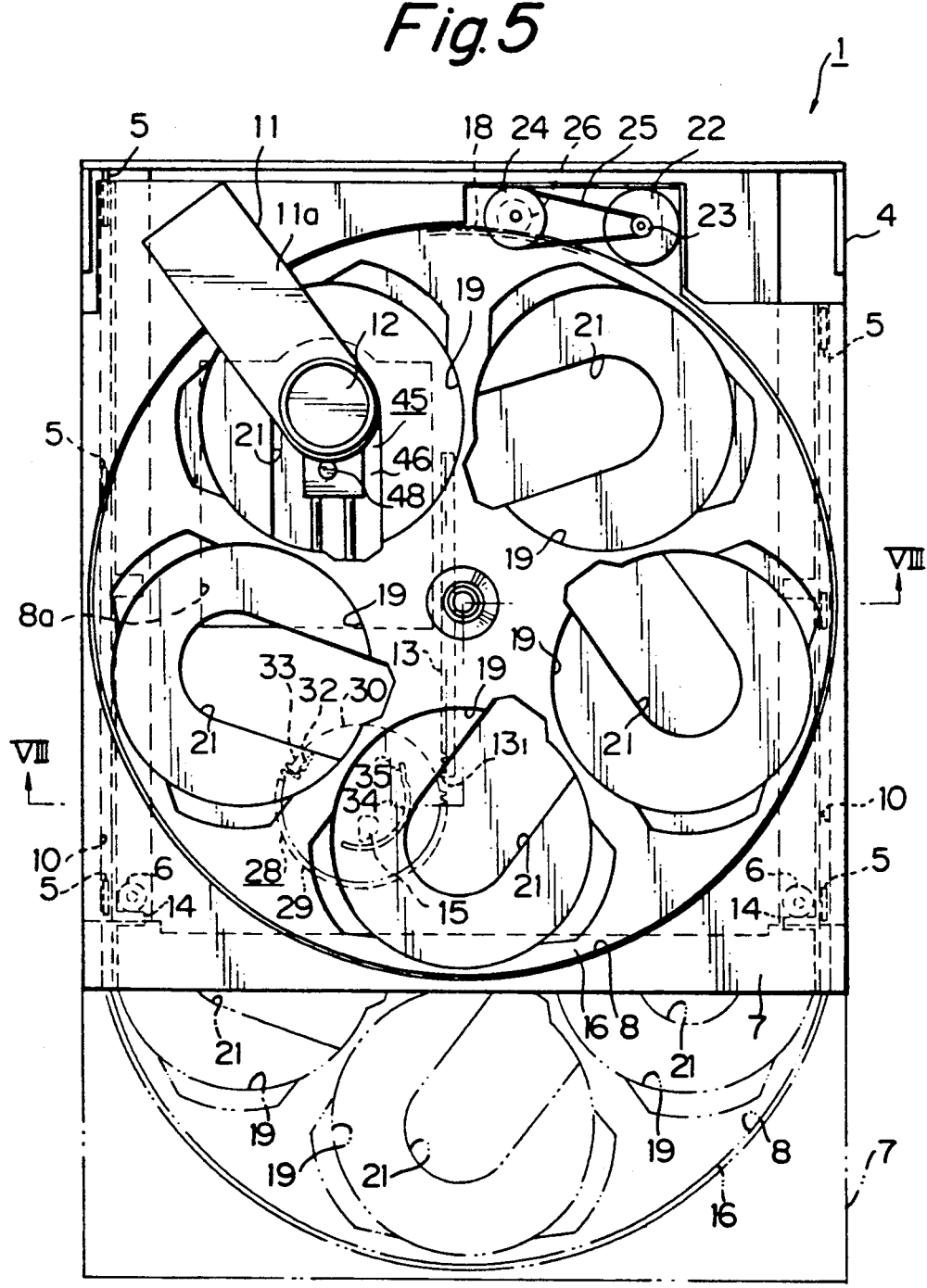
FIG. 5 is an enlarged plan view showing a state in which the outer casing is removed.
Figure 6:
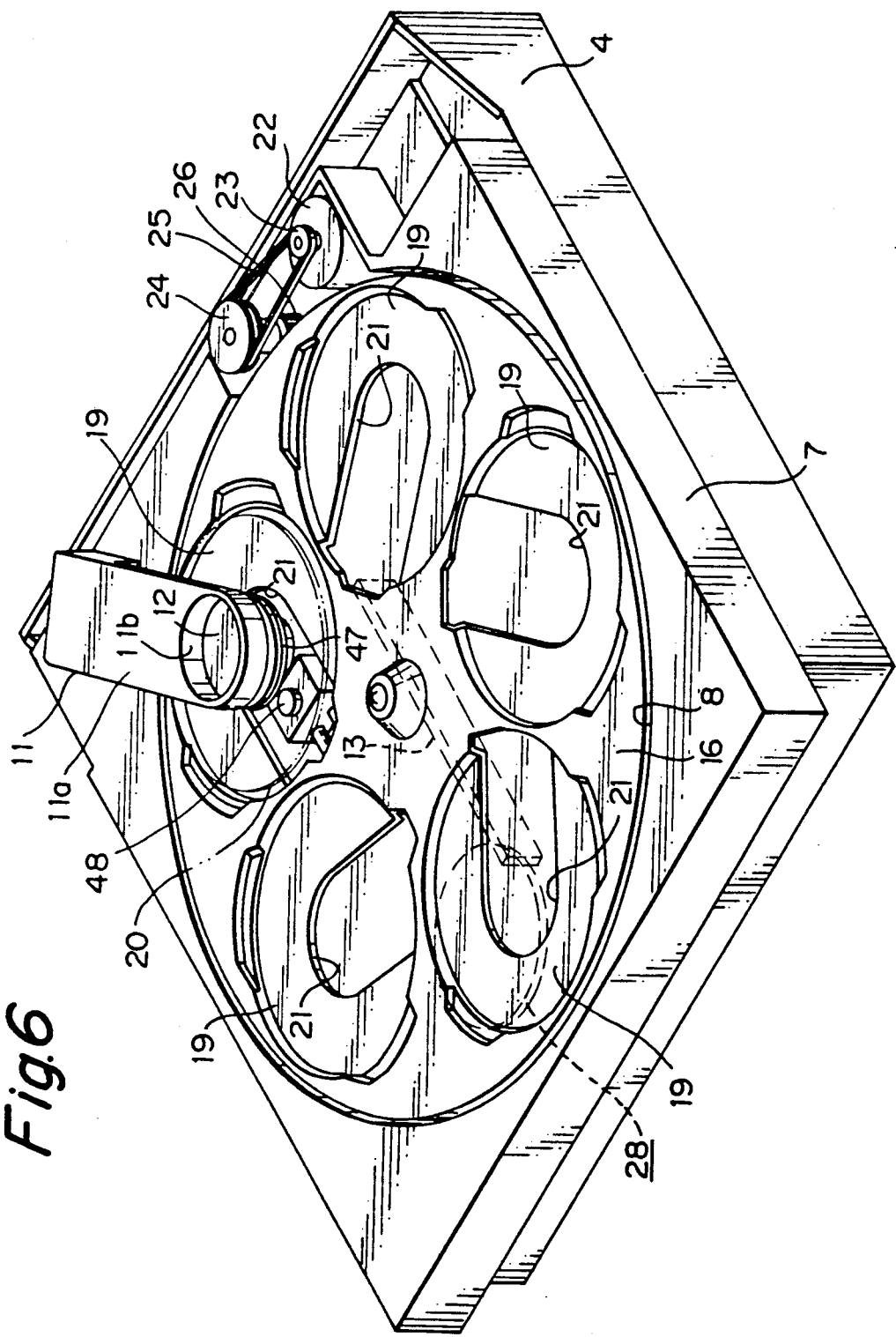
FIG. 6 is a perspective view showing the slide tray and a chassis.
Figure 7:
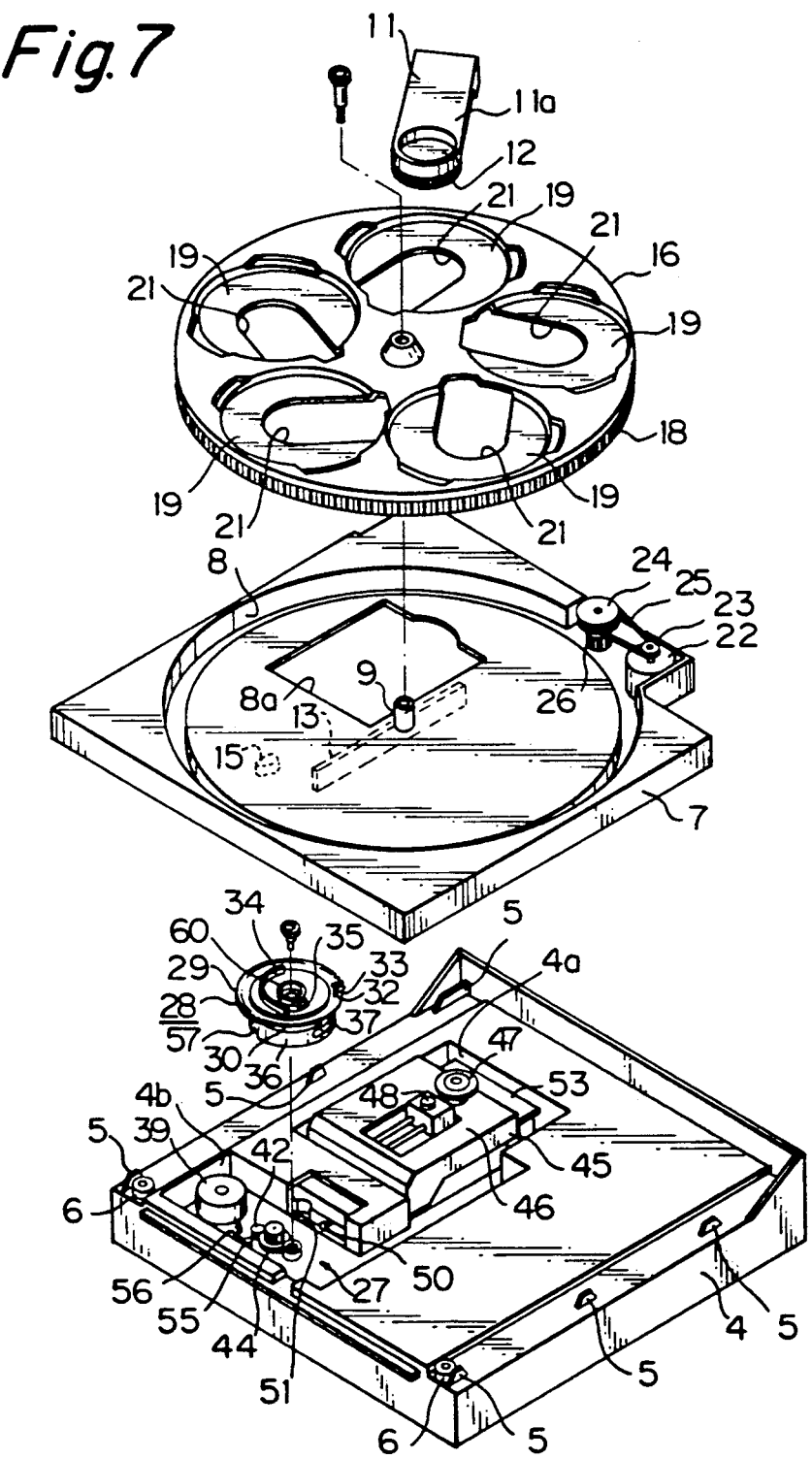
FIG. 7 is an exploded perspective view of the slide tray and the chassis.
Figure 8:
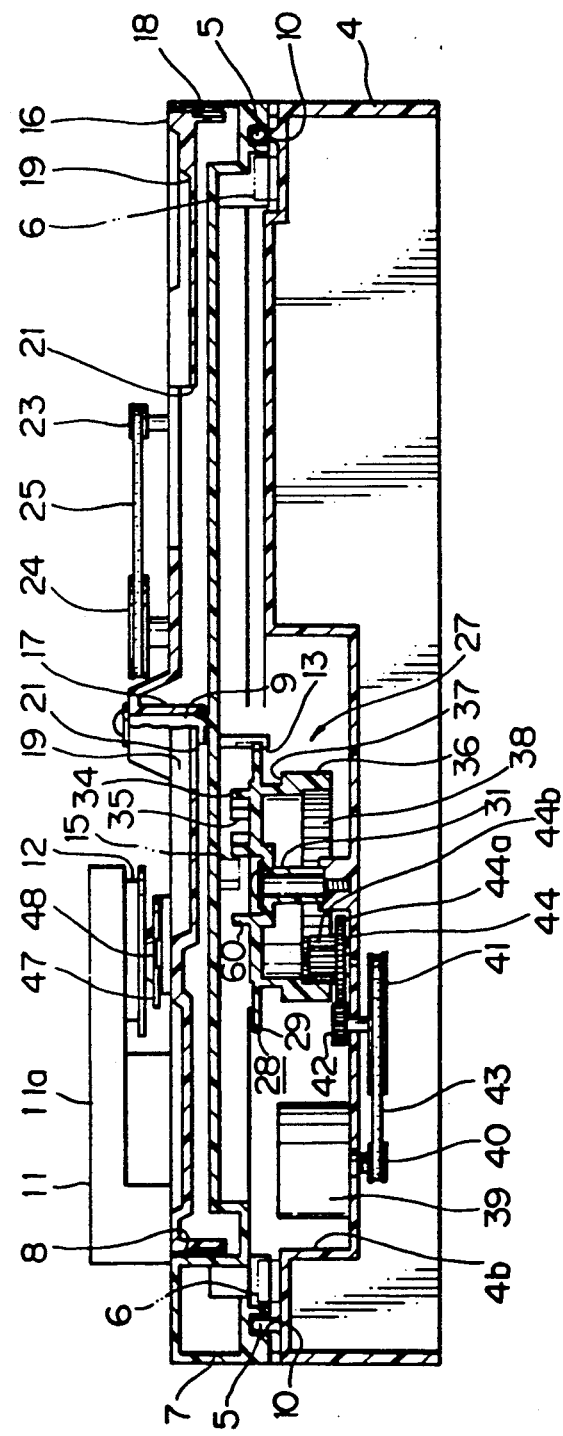
FIG. 8 is a cross sectional view taken along the line VIII—VIII in FIG. 5.

The disc table 16 is clockwise and counterclockwise rotated in FIG. 5. The position of the disc table 16 and the presence or absence of the discs 20 put on the disc setting portions 19 and the like are detected by detecting means (not shown).

The disc table 16 is rotated as necessary for a period of time when the slide tray 7 is moved from the pull-out position to the pull-in position or in a state in which the slide tray 7 is located at the pull-in position (hereinafter, referred to as a "pull-in state") and is stopped when either one of the disc setting portions 19 on which the disc 20 to be reproduced is placed comes to the position just under the chucking member 12 (hereinafter, such a position is referred to as a "reproducing position").

e. Loading mechanism (FIGS. 5 and 7 to 16)

Figure 9:
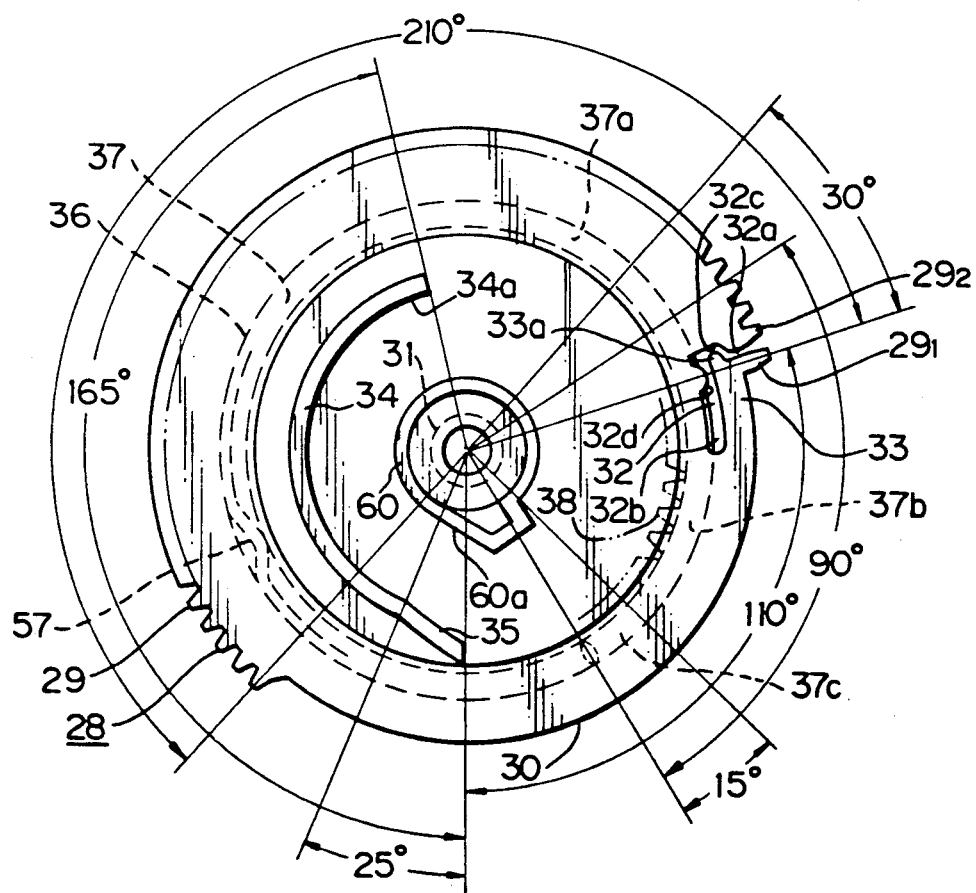
FIG. 9 is an enlarged plan view of a loading gear.
Figure 10:
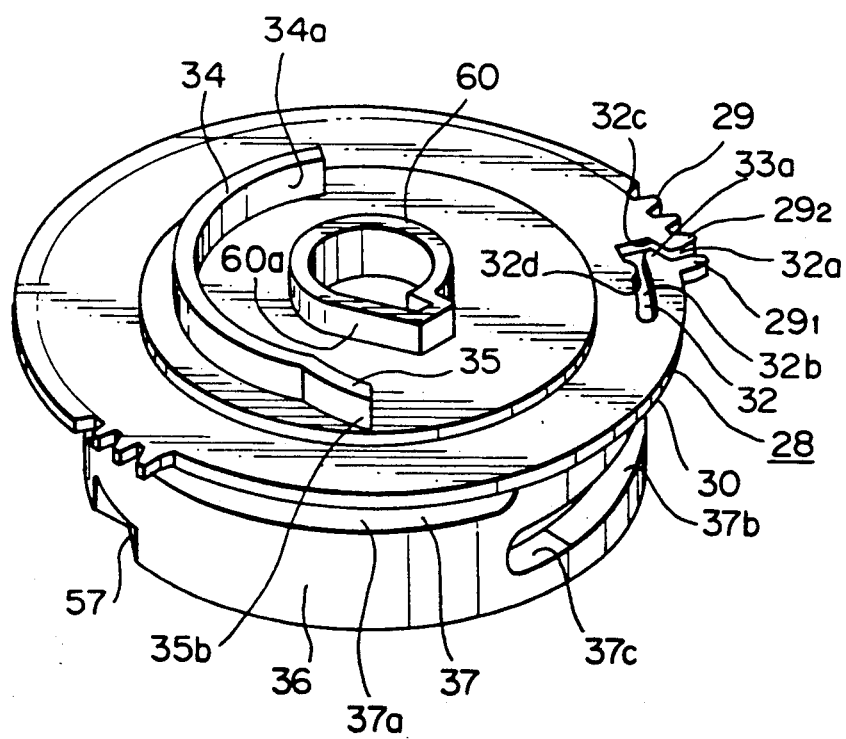
FIG. 10 is a perspective view of the loading gear.
Figure 11:
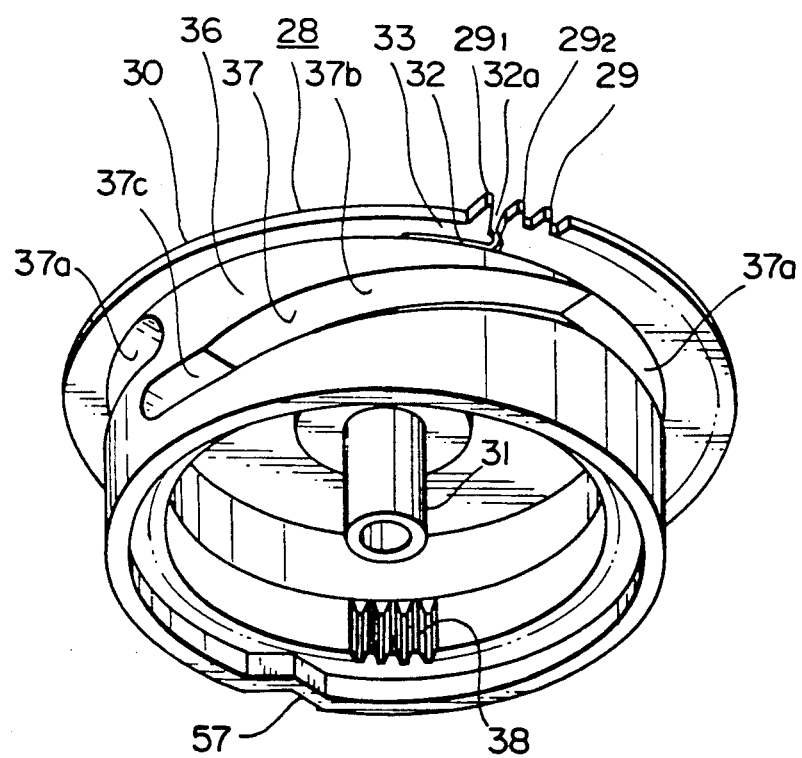
FIG. 11 is a perspective view of the loading gear when it is seen from below.
Figure 12A:
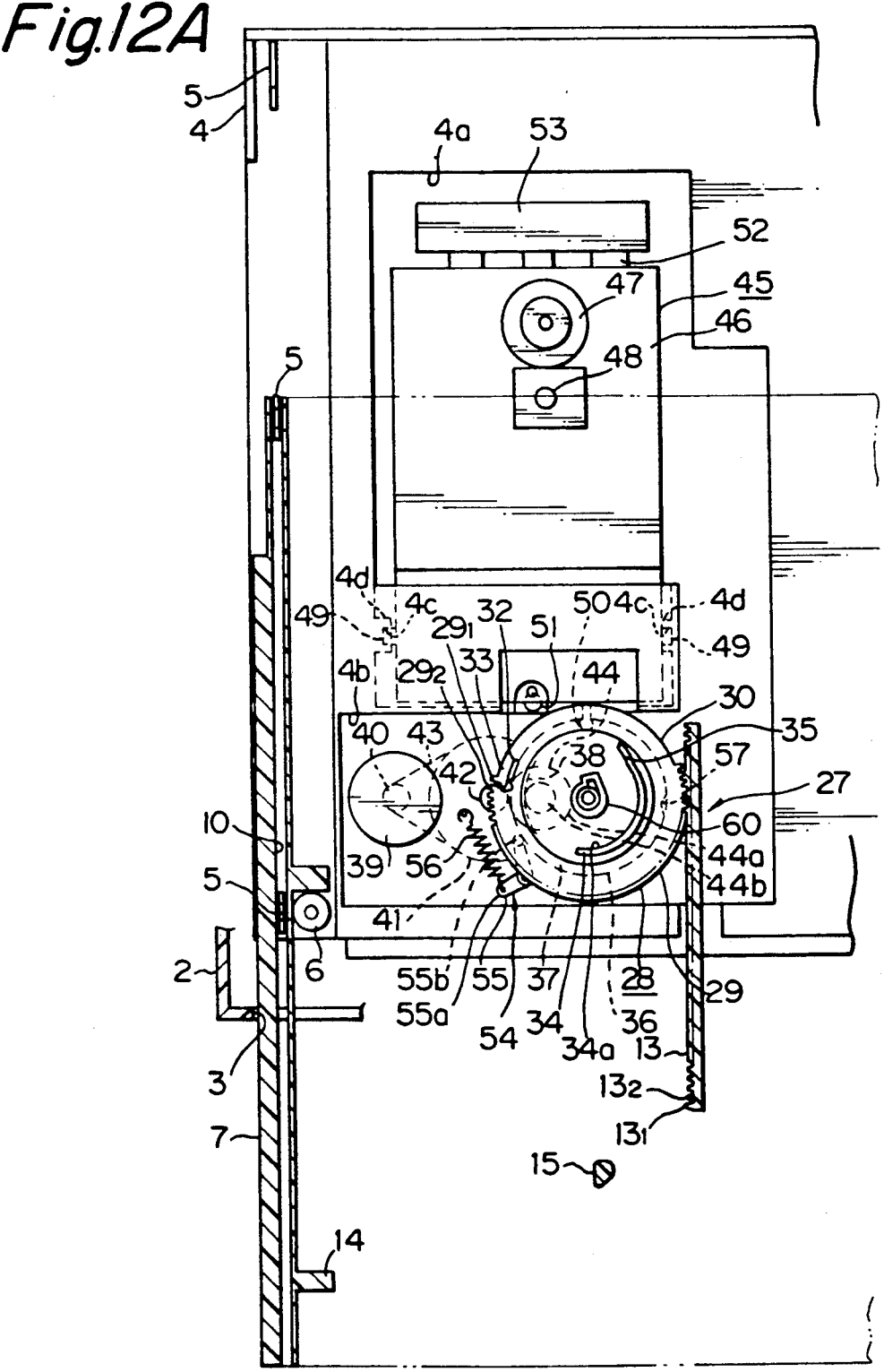
FIG. 12A and B show a pull-out state of the slide tray where
Figure 13A:
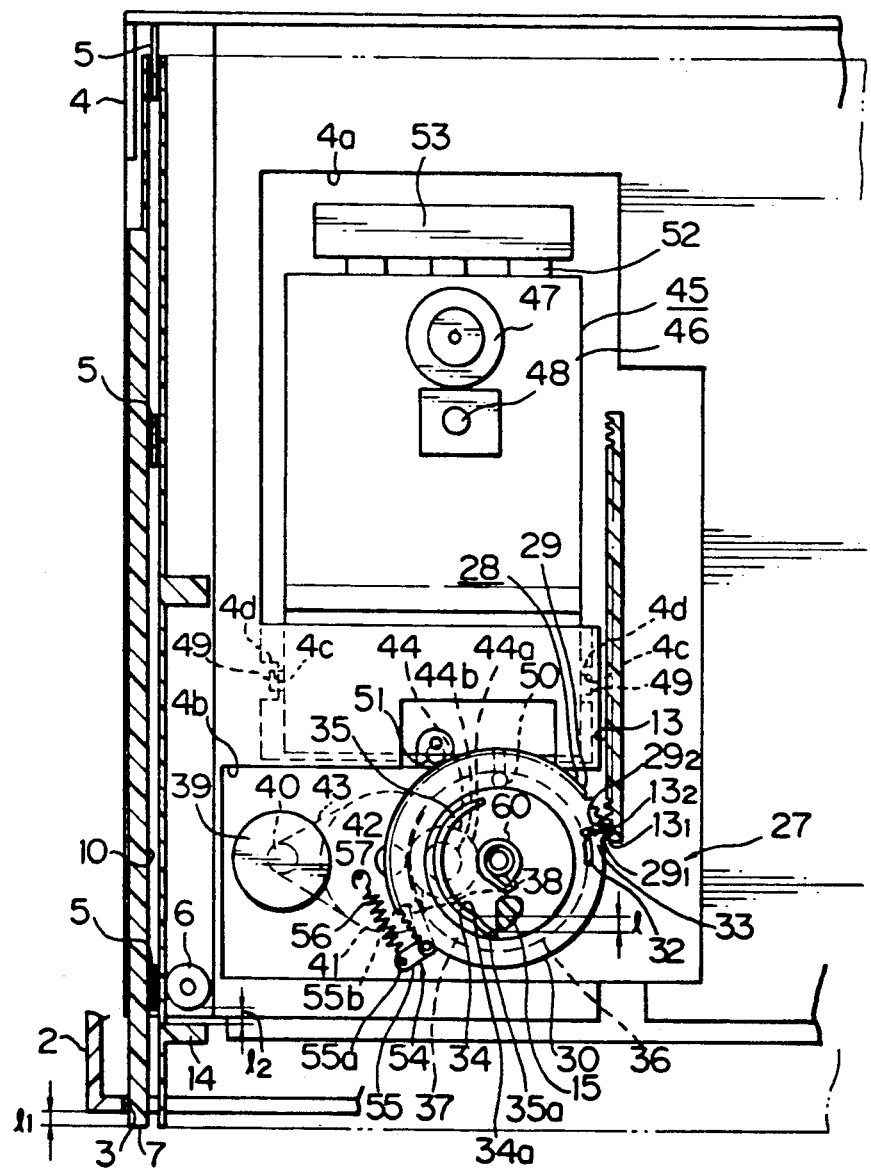
FIGS. 13A and B show a state just before completion of the pull-in of the slide tray where
Figure 14A:
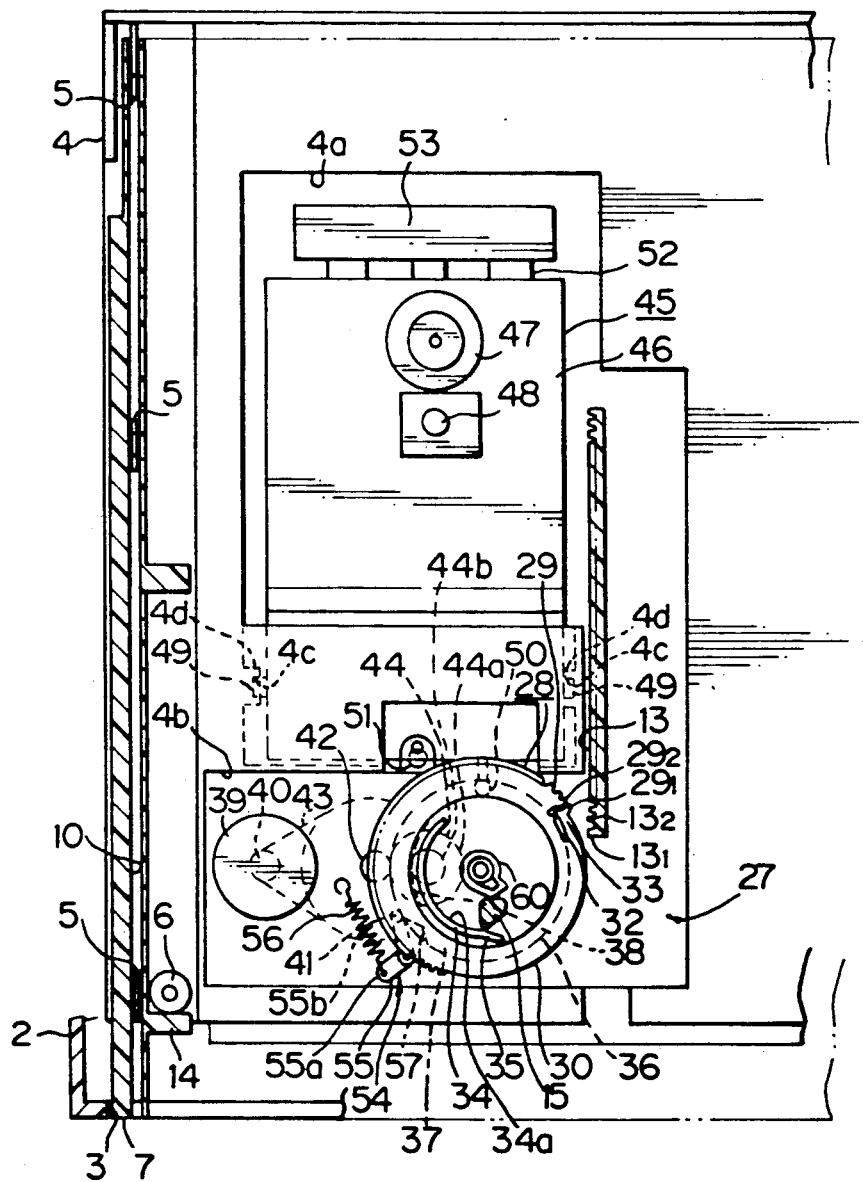
FIG. 14A and B show a pull-in state of the slide tray where
Figure 15A:
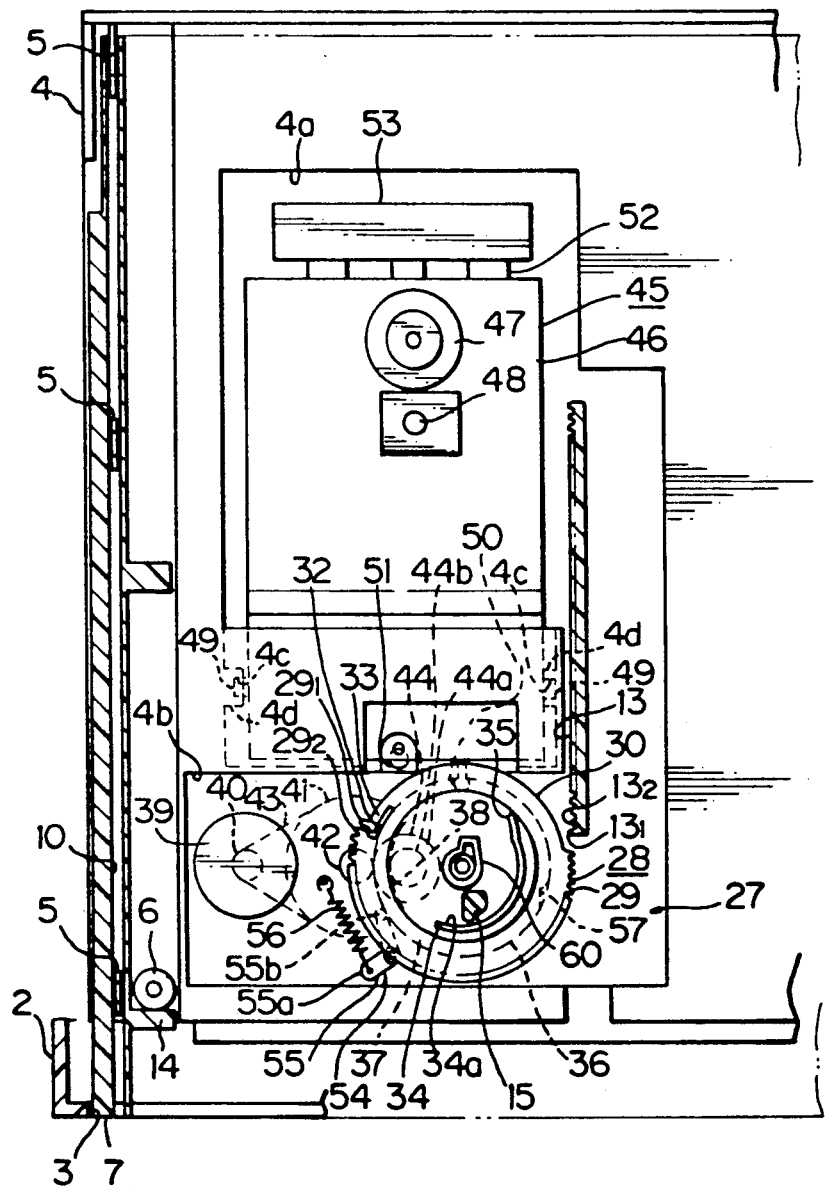
FIGS. 15A and B show a loading completion state where

Reference numeral 27 denotes a loading mechanism to move the slide tray 7 and the mechanical deck.

e-1. Loading gear (FIGS. 9 to 11)

Reference numeral 28 denotes a flat-gear shaped loading gear which is provided at a position close to the left side front portion of the chassis 4. The loading gear 28 is formed with a driving gear portion 29 in a range of a center angle of about 210° on the outer peripheral edge. A notched tooth portion 30 is formed in a remaining range of about 150° of the outer periphery of the loading gear 28. On the other hand, a boss 31 formed with a screw through hole is integratedly formed from the center of the lower surface of the loading gear 28 and is rotatably supported into the concave portion 4b of the chassis 4. The driving gear portion 29 comes into engagement with the rack 13 of the slide tray 7 at a predetermined position.

On the other hand, an almost L-shaped notch 32 is formed in the tooth bottom between a gear tooth $29_1$ (referred to as a "first gear tooth" hereinafter) locating on the clockwise side edge when it is seen from the upper direction in the gear portion 29 of the loading gear 28 and a gear tooth 29₂ (hereinafter, referred to as a "second gear tooth") adjacent to the first gear tooth. The notch 32 extends in the radial direction and an edge portion of one side 32a of the notch 32 is opened and the other side 32b extends in the peripheral direction. Due to this, an elastic member 33 having an elasticity is formed in the relevant portion of the gear portion 29 in the radial direction. The first gear tooth 29₁ is located at the tip of the elastic member 33 and is movable in the radial direction.

On the other hand, a stairway portion 32c which is directed to an almost central side of the loading gear 28 is formed in the edge portion of the side 32a of the L-shaped notch 32 on the side of the second gear tooth 29₂. A convex portion 33a which faces the stairway portion 32c is formed in the tip portion of the elastic member 33. When the elastic member 33 is deflected to the outside, the convex portion 33a is come into contact with the stairway portion 32c. Thus, a deflection of the elastic member 33 to the outside, that is, a projection amount of the first gear tooth 29₁ to the outside is specified.

Further, a projecting portion 32d is formed at a position close to the side 32a in the edge portion on the side opposite to the elastic member 33 of the other side 32b of the L-shaped notch 32 so as to narrow the gap of the notch 32. When the elastic member 33 is deflected to the inside, the portion close to the tip of the elastic member 33 is come into contact with the projecting portion 32d. Thus, a deflection of the elastic member 33 to the inside, that is, a concave amount of the first gear tooth 29₁ is restricted.

Reference numeral 34 denotes a pull-in state holding member having a projection shape which is formed on the upper surface of the loading gear 28 at an almost intermediate position between the center of the loading gear and the outer peripheral edge so as to be concentrical with the loading gear 28 and have an arc-like shape of about 140° as a center angle. The clockwise side edge of the pull-in state holding member 34 is located at a position which is counterclockwise away from the first gear tooth 29₁ of the driving gear portion 29 by an angle of almost 85° as a center angle. On the other hand, at a counterclockwise side edge of the pull-in state holding member 34, a cam member 35 which is slightly outwardly deviated as it goes counterclockwise is formed continuously with such a counterclockwise side edge in a range of about 25° as a center angle.

An inside surface 34a of the pull-in state holding member 34 comes into engagement with the front edge of the abutted member 15 in the pull-in state of the slide tray 7, so that the pull-in state of the slide tray 7 is held.

On the other hand, the cam member 35 come into engagement with the abutted member 15 just before the slide tray 7 comes to the pull-in position. As will be explained in detail hereinlater, the above engagement is started almost simultaneously with a timing for disengagement between the loading gear 28 and the rack 13. The slide tray 7 is pulled in from the above state to pull-in state.

A deviation ratio of the cam member 35 which is deviated outwardly as it approaches the tip portion is set in a manner such that in the case where the loading gear 28 rotates at an equal velocity, a pull-in speed of the slide tray 7 by the engagement between the cam-member 35 and the abutted member 15 is slower than a pull-in speed of the slide tray 7 by the engagement between the driving gear portion 29 of the loading gear 28 and the rack 13. On the other hand, a deviation amount of the tip portion of the cam member 35 (a distance between an extension line of the inside surface 34a of the pull-in state holding member 34 and the tip portion of the cam member 35 in the case where they are connected in the direction of the diameter of the loading gear 28) l₁ is almost equal to a projection amount l₁ of the outer casing 2 of the slide tray 7 from the tray entrance/exit port 3 at a moment when the rack 13 disengages from the loading gear 28 and is slightly larger than an interval l₂ between the stopper members 6 and the abutting members 14 in the above state. Further a tray pushing-out cam member 60 for gradually pushing out the disc tray 7 upon starting of an unloading operation is provided on the inner circumference side of the cam member 35. The cam member 60 is provided so that a projecting portion 60a, for pushing out the abutted member 15 upon unloading faces the tip portion of the cam member 35.

e-2. Cam cylinder (FIGS. 9 to 11)

Reference numeral 36 denotes a cylindrical cam cylinder which is formed under the lower surface of the loading gear 28 concentrically therewith. A cam groove 37 is formed on the outer peripheral surface of the cam cylinder 36 and is used to ascend and descend the mechanical deck, which will be explained hereinlater.

The cam groove 37 comprises: a portion 37a (hereinafter, referred to as a "descent holding portion") which extends in the horizontal direction at a position close to the upper edge of the outer peripheral surface of the cam cylinder 36 and is formed in a range of about 270° as a center angle and holds the mechanical deck at the descending position; a portion 37b (hereinafter, referred to as a "moving portion") which is downwardly deviated as it goes clockwise and is formed in a range of about 75° as a center angle and ascends or descends the mechanical deck; and a portion 37c (hereinafter, referred to as an "ascent holding portion") which extends in the horizontal direction at a position close to the lower edge and is formed in a range of about 15° as a center angle and holds the mechanical deck at the ascending position.

On the other hand, a boundary portion between the descent holding portion 37a of the cam groove 37 and the moving portion 37b is located at a position which is away from the first gear tooth 29₁ of the loading gear 28 by a center angle of about 20° to the counterclockwise side. A boundary portion between the moving portion 37b of the cam groove 37 and the ascent holding portion 37c is located at a position which is away from the first gear tooth 29₁ of the loading gear 28 by a center angle of about 60° to the clockwise side.

Reference numeral 38 denotes an inner tooth gear portion which is formed on the inner peripheral surface which is close to a slightly upper position than the lower edge of the cam cylinder 36 and is in engagement with a driving gear, which will be explained hereinlater.

e-3. Driving system (FIGS. 7, 8, and 12 to 16)

Reference numeral 39 denotes a loading motor fixed to the chassis 4. A driving pulley 40 is supported to an output shaft of the loading motor 39.

Reference numeral 41 denotes a reduction pulley which is rotatably supported to the chassis 4 and is integratedly formed with a gear portion 42 of a small diameter. An endless belt 43 extends between the reduction pulley 41 and the driving pulley 40.

Reference numeral 44 denotes a reduction gear which is rotatably supported to the chassis 4. The reduction gear 44 is constructed by integratedly forming a flat gear portion 44a adapted to be come into engagement with the gear portion 42 of the reduction pulley 41 and a slightly thick pinion gear portion 44b adapted to be come into engagement with the inner tooth gear portion 38 of the cam cylinder 36.

When the loading motor 39 rotates, the rotation is transferred along a transferring path of the driving pulley 40—belt 43—reduction pulley 41 gear portion 42—flat gear portion 44a of the reduction gear 44—pinion gear portion 44b of the reduction gear 44—inner tooth gear portion 38 of the cam cylinder 36—loading gear 28, so that the loading gear 28 rotated.

When the slide tray 7 is pulled into the outer casing 2 and the mechanical deck is ascended (hereinafter, these operations are referred to as a "loading"), the loading motor 39 rotates clockwise, thereby rotating counterclockwise the loading gear 28 and the cam cylinder 36. On the other hand, when the slide tray 7 is pulled out of the outer casing 2 and the mechanical deck is descended (hereinafter, the above operations are referred to as an "unloading"), the loading motor 39 rotates counterclockwise, thereby rotating clockwise the loading gear 28 and the cam cylinder.

e-4. Mechanical deck (FIGS. 7 and 12 to 16)

Reference numeral 45 denotes a mechanical deck arranged at a position which is slightly closer to the rear portion of the left half of the chassis 4. The mechanical deck 45 comprises: a mechanical chassis 46 having crank-like shape when it is seen from the side direction; a turn table 47 arranged over the upper surface of the rear edge portion of the chassis 46; a pickup 48 which is supported to slightly front position of the turn table 47 so as to be movable in the front/rear direction; and the like.

The mechanical chassis 46 comprises: a mechanism portion 46a which is smaller than the mechanical deck arranging hole 4a of the chassis 4 by one rank and in which the turn table 47, pickup 48, and the like are arranged; and a supporting portion 46b in which a portion at a position which is slightly lower than the front edge of the mechanism portion 46a is projected forwardly and a right/left width dimension and a front-/rear length are almost half of those of the mechanism portion 46a. Supporting shafts 49 which are projected to the side direction are integrally formed at an almost center in the front/rear direction of both of the right and left side surfaces of the supporting portion 46b. On the other hand, a spherical engaging member 50 which slidably comes into engagement with the cam groove 37 of the cam cylinder 36 is integratedly projected and formed at the front edge of the supporting portion 46b.

According to such a mechanical deck 45, the supporting shafts 49 of the mechanical chassis 46 are located between the mechanical deck arranging hole 4a of the chassis 4 and the concave portion 4b and are rotatably supported to supporting ribs 4d having supporting holes 4c which are respectively opened in the right or left direction. Thus, the mechanical deck 45 is supported in a state in which it can swing like a seesaw.

Reference numeral 51 denotes a coil spring which is shrunk and arranged between the front edge mechanical chassis 46 and the bottom plate of the chassis 4. Therefore, a counterclockwise rotational force when it is seen from the left direction is applied to the mechanical chassis 46. The mechanical chassis 46 is swung between the ascending position where the upper surface of the mechanism portion 46a and the upper surface of the chassis 4 form substantially a flush surface and the descending position where the upper surface of the mechanism portion 46a is inclined counterclockwise at an angle of about 15° when it is seen from the left direction.

The mechanical chassis 46 is stopped at the ascending position when a projection 52 which is projected rearwardly from the rear edge lower portion of the mechanism portion 46a of the mechanical chassis 46 is come into contact with a rotation blocking plate 53 fixed to the chassis 4 so as to be located on a locus of the projection 52.

In the case where the slide tray 7 is located at the pull-in position and the disc setting portion 19 of the disc table 16 is located at a predetermined position, if the mechanical deck 45 reaches the ascending position, the turn table 47 and the pickup 48 are projected into the disc setting portion 19 through the notch 8a of the circular concave portion 8 of the slide tray 7 and through the opening portion 21 of the disc setting portion 19. On the other hand, at this time, if the disc 20 is placed onto the disc setting portion 19, the disc 20 is put on the turn table 47 and is remove away from the bottom portion of the disc setting portion 19 and is sandwiched by the turn table 47 and the chucking member 12 locating over the turn table, so that the chucking is performed in a state in which the disc is slightly floating from the bottom portion of the disc setting portion 19.

f. Operation (FIGS. 12 to 16 )

Loading and unloading operations of the slide tray 7 and the mechanical deck 45 are executed as follows by the loading mechanism 27 constructed as mentioned above.

f-1 Loading

When a loading command is input in a state in which the slide tray 7 is located at the pull-out position (hereinafter, referred to as a "pull-out state" the loading motor 39 rotates clockwise. As mentioned above, the loading gear 28 and the cam cylinder 36 are rotated counterclockwise, thereby moving the slide tray 7 in the direction of the pull-in position. Further, after that, the mechanical deck 45 is ascended in the direction of the ascending position.

That is, in the pull-out state of the slide tray 7 (refer to FIG. 12), the gear teeth on the rear edge side of the rack 13 are in engagement with the gear teeth of the counterclockwise side edge of the driving gear portion 29 of the loading gear 28. On the other hand, the engaging member 50 of the supporting portion 46b of the mechanical chassis 46 is in engagement with the counterclockwise side edge of the decent holding portion 37a of the cam groove 37 of the cam cylinder 36. When the loading gear 28 and the cam cylinder 36 rotate counterclockwise, the slide tray 7 is conveyed in the direction of the pull-in position in accordance with the rotation of the loading gear 28 with which the rack 13 is in engagement. On the other hand, the engaging member 50 of the mechanical chassis 46 relatively slides in the descent holding portion 37a of the cam groove 37 and the vertical position is held in this state.

When the pull-in of the slide tray 7 is completed, the engaging member 50 is first moved from the descend holding portion 37a of the cam groove 37 to the moving portion 37b and the inclining motion to the upper position side of the mechanical deck 45 is started. On the other hand, when the slide tray 7 is located at a position which is away from the pull-in position to this side by a predetermined distance 1 (hereinafter, referred to as a "position just before completion of the pull-in"), the engagement between the first gear $29_1$ of the driving gear portion 29 of the loading gear 28 and a second rack tooth 13, adjacent to the front edge tooth $13_1$ of the rack 13 is cancelled. At the same time, the abutted member 15 of the slide tray 7 comes into engagement with an edge portion 35a of the cam member 35 formed on the upper surface of the loading gear 28 (refer to FIG. 13).

When the loading gear 28 further rotates counterclockwise from the above state, the abutted member 15 of the slide tray 7 is pressed rearwardly by the cam member 35 of the loading gear, so that the slide tray 7 is pulled into the pull-in position. On the other hand, for an interval from the position just before completion of the pull-in to the pull-in position, the abutting members 14 of the slide tray 7 abut on the stopper members 6 of the chassis 4. When the slide tray 7 reaches the pull-in position, the abutting members 14 are elastically come into contact with the stopper members 6 in a state in which they are slightly depressed (refer to FIG. 14).

On the other hand, simultaneously with that the slide tray 7 arrives at the pull-in position the abutted member 15 comes into engagement with the pull-in state holding member 34 from the engagement with the cam member 35. Even if the loading gear 28 further rotates counterclockwise, since the pull-in state holding member 34 has an arc-like shape which is concentrical with the loading gear 28, the rearward movement of the slide tray 7 by the above engagements is not performed.

In the case where the slide tray 7 is located at the pull-in position, since the first rack tooth $13_1$ of the rack 13 is formed slightly larger than the other rack teeth, the tip portion of the first rack tooth $13_1$ is located on the inside than the tooth edge circle of the driving gear portion 29 of the loading gear 28.

On the other hand, for a period of time of the counterclockwise rotation of the loading gear 28, the engaging member 50 of the mechanical chassis 46 relatively moves in the moving portion 37b of the cam groove 37 of the cam cylinder 36, so that the mechanical chassis 46 is moved in the direction of the ascending position. Further, the engaging member 50 of the mechanical chassis 46 comes into engagement with the ascending position holding portion 37c of the cam groove 37 by the counterclockwise rotation of the cam cylinder 36, thereby completing the loading of the mechanical deck 45 (refer to FIG. 15).

On the other hand, since a state in which the slide tray 7 is held at the pull-in position corresponds to a state in which the stopper members 6 are in elastic contact with the abutting members 14, a force in the pull-out direction is applied to the slide tray 7. Due to this, the abutted member 15 comes into pressure contact with the inside surface 34a of the pull-in state holding member 34 and the above state of the slide tray 7 is held without causing any shaking of the chassis 4.

f-2. Unloading

When the unloading command is input in the loading completion state as mentioned above, the loading motor 39 rotates counterclockwise and the loading gear 28 and the cam cylinder 36 are rotated clockwise as mentioned above, thereby descending the mechanical deck 45 in the direction of the descending position and conveying the slide tray 7 in the direction of the pull-in position. That is, out the loading completion state of the mechanical deck 45 as mentioned above, the engaging member 50 of the supporting portion 46b of the mechanical chassis 46 is in engagement with the clockwise side edge of the ascending position holding portion 37c of the cam groove 37 of the cam cylinder 36. On the other hand, the notched tooth portion 30 of the loading gear 28 is located on the locus of the rack 13 of the slide tray 7 so as to face the rack 13. Further, the tip portion of the first rack tooth 13, of the rack 13 is located on the inside of the tooth edge circle of the driving gear portion 29 as mentioned above. When the loading gear 28 and the cam cylinder 36 rotate clockwise, the engaging member 50 of the mechanical chassis 46 relatively moves from the ascending position holding portion 37c of the cam groove 37 to the moving portion 37b, so that the mechanical deck 45 is conveyed in the direction of the descending position.

On the other hand, since the abutted member 15 of the slide tray 7 is held in the engaging state with the pull-in state holding member 34 of the loading gear 28 and the rack 13 faces the notched tooth portion 30 of the loading gear 28, the slide tray 7 is held in the pull-in state.

When the first gear tooth $29_1$ of the driving gear portion 29 of the loading gear 28 approaches the position of the rack 13, the abutted member 15 comes into engagement with the cam member 35 from the engagement with the pull-in state holding member 34. The holding force in the pull-in state to the slide tray 7 is cancelled, thereby allowing the forward movement. When the loading gear 28 further rotates clockwise, the first gear tooth $29_1$ of the driving gear portion 29 comes into contact with the tip portion of the first rack tooth $13_1$ of the rack 13, thereby slightly moving the rack 13 forwardly. Thus, the engagement between the driving gear portion 29 and the rack 13 is started.

Simultaneously with that the engagement of the abutted member 15 with the pull-in state holding member 34 is shifted to the engagement with the cam member 35, the disc tray 7 is gradually pushed out by the projecting portion 60a of the tray pushing-out cam member 60. When the first tooth $13_1$ of the rack 13 and the driving gear portion 29 are come into engagement, the tray 7 is in a moving state, so that the shock which is generated when the first tooth $13_1$ of the rack 13 collides with the driving gear portion 29 is reduced.

Figure 16:
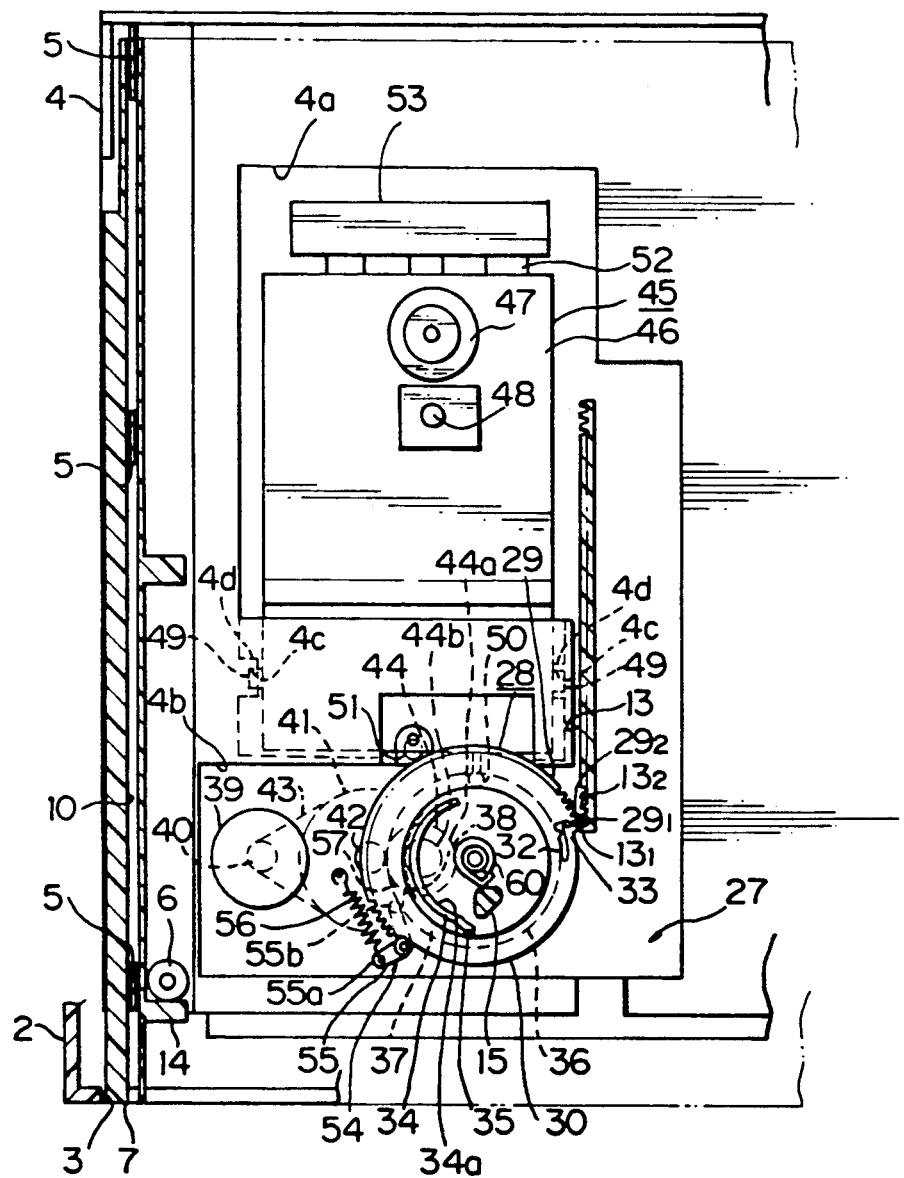
FIG. 16 is an enlarged plan view of the main section showing a state in which the slide tray is returned to a state just before completion of the pull-in from the pull-in state.

On the other hand, when the first tooth $13_1$ of the rack 13 is come into engagement with the first gear tooth $29_1$ of the driving gear portion 29, since the first gear tooth $29_1$ is formed in the tip portion of the elastic member 33, the elastic member 33 is slightly curved to the central side when they are come into contact, so that the shock is reduced and a collision sound or the like is not generated (refer to FIG. 16).

Further, simultaneously with the start of the engagement between the driving gear portion 29 of the loading gear 28 and the rack 13, the engagement between the abutted member 15 of the slide tray 7 and the cam member 35 is cancelled, thereby enabling the slide tray 7 to be moved forwardly, that is, in the direction of the pull-out position.

When the loading gear 28 and the cam cylinder 35 further rotate clockwise, the engaging member 50 of the mechanical chassis 46 moves from the moving portion 37b of the cam groove 37 to the descending position holding portion 37a. The slide tray 7 is pulled out in the direction of the pull-out position with the mechanical deck 45 held at the descending position. The unloading is completed.

g. Others

Reference numeral 54 denotes a forced rotating mechanism which is used in a manner such that in the case where the slide tray 7 is manually enclosed to the pull-in position without driving the loading motor 39 in the unloading state (for instance, at the time of a power failure), simultaneously with that the engagement between the driving gear portion 29 of the loading gear 28 and the rack 13 is cancelled, the loading gear 28 is rotated counterclockwise, thereby certainly performing the engagement between the cam member 35 of the loading gear 28 and the abutted member 15 of the slide tray 7.

The forced rotating mechanism 54 comprises: an almost L-character like elastically contact L-shaped arm 55 whose bending portion is rotatably supported to the chassis 4; and a tension spring 56 which is retained to a tip portion of one arm 55a of the elastically contact L-shaped arm 55 and applies a rotating force thereto. A tip portion of another arm 55b of the arm 55a of the elastically contact L-shaped arm 55 to which the tension spring 56 is retained is in elastic contact with the lower edge of the outer peripheral surface of the cam cylinder 36.

On the other hand, at the lower edge of the outer peripheral surface of the cam cylinder 36, a concave portion 57 is formed at a position which is away from the first gear tooth 29₁ of the driving gear portion 29 by an angle of about 180° as a center angle when it is seen from the upper direction.

When the slide tray 7 is manually depressed, at a position where the tip portion of the arm 55b of the elastically contact L-shaped arm 55 which is in elastic contact with the outer peripheral surface of the cam cylinder 36 comes to the concave portion 57, such a tip portion tries to drop into the bottom portion by the elastic force of the tension spring 56, thereby forcedly rotating the cam cylinder 36. The cam cylinder 36 and the loading gear 28 are forcedly rotated as mentioned above even if the rotational force is not applied by the loading motor 39. Therefore, almost simultaneously with that the engagement between the loading gear 28 and the rack 13 is released, the engagement between the cam member 35 of the loading gear 28 and the abutted member 15 is performed.

Although not shown, the disc player 1 is provided with a limiter switch for detecting that the slide tray 7 has reached the pull-in position. When the slide tray 7 arrives at the pull-in position, the loading motor 39 is stopped. In addition, a detection switch for detecting whether the present state is the loading state or the unloading state is provided. When an OPEN/CLOSE button to instruct the loading or unloading state is depressed, the forward or reverse rotation of the loading motor is determined.

As will be obviously understood from the above description, a disc tray loading mechanism of the invention relates to a disc tray loading mechanism comprising: a disc tray onto which recording medium discs are detachably set and which moves between a pull-out position where the disc tray was pulled out of a casing and a pull-in position where the disc tray was pulled into the casing and which has a rack extending along the moving direction; and a loading gear which is rotatably supported to the casing and has a tooth portion which is come into engagement with the rack of the disc tray, characterized in that an abutted portion is formed in a portion of the disc tray which faces the loading gear in the pull-in state of the disc tray, a pull-in state holding portion having an arc-like shape which is concentrical with the loading gear and holds the disc tray into the pull-in state by being come into engagement with the abutted portion is formed on the upper surface of the loading gear, a cam portion is formed in an edge portion of the pull-in state holding portion on the side of the start of the engagement with the abutted portion, the engagement between the loading gear and the rack of the disc tray is released just before completion of the pull-in of the disc tray, and at the same time, the engagement between the cam portion of the loading gear and the abutted portion of the disc tray is started, thereby executing the subsequent pull-in of the disc tray by the pressing motion of the cam portion to the abutted portion.

Therefore, according to the disc tray loading mechanism of the invention, the pull-in speed of the disc tray can be reduced just before completion of the pull-in of the disc tray and a shock which occurs upon completion of the pull-in of the disc tray can be reduced. Thus, a shock sound due to the collision of the disc tray and the member on the casing side for restricting the pull-in position of the disc tray is eliminated. In addition, an adverse influence on each section of the disc player by the collision is eliminated and the quality of the disc player can be raised.

The embodiment has been described with respect to the case where the disc tray loading mechanism of the invention was applied to an automatic changing type disc player in which a plurality of compact discs can be set. However, the invention is not limited to such a case and can be also applied to a disc player which can reproduce only one compact disc. On the other hand, the invention is not limited to a compact disc player but can be also applied to video disc player and further to what is called a multi-disc player which can reproduce a plurality of kinds of discs such as compact disc, video disc, and the like.

On the other hand, in the embodiment, the invention has been applied to the disc player in which both of the pull-in and pull-out operations of the slide tray and the ascending and descending operations of the mechanical deck can be executed by one loading gear. However, the invention is not limited to such a player but can be also applied to a disc player having a loading gear to execute only the pull-in/out operations of the slide tray.

Further, the practical shape, structure, and construction shown in the embodiment have been shown as a merely examples to embody the disc tray loading mechanism of the invention. The technical scope of the invention must not be limitedly interpreted by them.

What is claimed is:

1. A disc tray loading mechanism comprising: a disc tray onto which discs are detachably set and which moves between a pull-out position where the disc tray is pulled out of a casing and a pull-in position where said disc tray is pulled into the casing and which has a rack extending along a side of said tray in its direction of travel; and a loading gear which is rotatably supported to the casing and which has a tooth portion adapted to engage the rack of said disc tray, wherein an abutted portion is formed on an upper surface of said disc tray which faces said loading gear in a pull-in state of said disc tray; and a pull-in state holding portion which has an arc-like shape formed on and concentric with said loading gear and which holds said disc tray in the pull-in position by engaging with the abutted portion, said pull-in state holding portion including a cam portion formed in an edge portion of the pull-in state holding portion where said pull-in state holding portion first engages said abutted portion, wherein said cam portion engages said abutting portion after said loading gear and said rack have released engagement just before completion of the pull-in of the disc tray, thereby finishing the pull-in of said disc tray after completion of the release of engagement between said loading gear and said rack by a pressing motion of the cam portion to the abutted portion.

2. A disc tray loading mechanism according to claim 1, wherein on the upper surface of said loading gear, there is provided a disc tray pushing-out cam portion which engages the abutted portion by rotation of said loading gear during the unloading of said disc tray, thereby moving said disc tray in the direction of the pull-out position.

3. A disc tray loading mechanism comprising: a disc tray onto which discs are detachably set and which moves between a pull-out position where the disc tray is pulled out of a casing and a pull-in position where said disc tray is pulled into the casing and which has a rack extending along a side of said tray in its direction of travel; and a loading gear which is rotatably supported to the casing and which has a tooth portion adapted to engage the rack of said disc tray, wherein an abutted portion is formed on an upper surface of said disc tray which faces said loading gear in a pull-in state of said disc tray; and a pull-in state holding portion which has an arc-like shape formed on and concentric with said loading gear and which holds said disc tray in the pull-in position by engaging with the abutted portion, said pull-in state holding portion including a cam portion formed in an edge portion of the pull-in state holding portion where said pull-in state holding portion first engages said abutted portion;

wherein said cam portion engages said abutting portion after said loading gear and said rack have released engagement just before completion of the pull-in of the disc tray, thereby finishing the pull-in of said disc tray after completion of the release of engagement between said loading gear and said rack by a pressing motion of the cam portion to the abutted portion, wherein on the upper surface of said loading gear, there is provided a disc tray pushing-out cam portion which engages with the abutted portion by rotation of said loading gear during the unloading of said disc tray, thereby moving said disc tray in the direction of the pull-out position, and wherein a first tooth of said loading gear is provided as an elastic member having flexibility in a radial direction of said loading gear.

4. A disc tray loading mechanism according to claim 1, further comprising rotation driving means for rotating said loading gear, and wherein said rotation driving means has forced rotating means for rotating said loading gear simultaneously when said loading gear disengages from the rack, thereby allowing the cam portion to be engaged with the abutted portion when said disc tray is moved in the direction of the pull-in position in an inoperative mode.

5. A disc tray loading mechanism comprising: a disc tray onto which discs are detachably set and which moves between a pull-out position where the disc tray is pulled out of a casing and a pull-in position where said disc tray is pulled into the casing and which has a rack extending along a side of said tray in its direction of travel; and a loading gear which is rotatably supported to the casing and which has a tooth portion adapted to engage the rack of said disc tray, wherein an abutted portion is formed on an upper surface of said disc tray which faces said loading gear in a pull-in state of said disc tray; and a pull-in state holding portion which has an arc-like shape formed on and concentric with said loading gear and which holds said disc tray in the pull-in position by engaging with the abutted portion, said pull-in state holding portion including a cam portion formed in an edge portion of the pull-in state holding portion where said pull-in state holding portion first engages said abutted portion;

wherein said cam portion engages said abutting portion after said loading gear and said rack have released engagement just before completion of the pull-in of the disc tray, thereby finishing the pull-in of said disc tray after completion of the release of engagement between said loading gear and said rack by a pressing motion of the cam portion to the abutted portion, said disc tray loading mechanism further comprising rotation driving means for rotating said loading gear, and wherein said rotation driving means has forced rotating means for rotating said loading gear simultaneously when said loading gear disengages from the rack, thereby allowing the cam portion to be engaged with the abutted portion when said disc tray is moved in the direction of the pull-in position of an inoperative mode, and wherein said forced rotating means comprises: an arm adapted to elastically come into contact with a side surface of the loading gear; and pressing means for rotationally pressing the arm.

6. A disc tray loading mechanism according to claim 1, further comprising stopper means made of an elastic member which contacts said disc tray when said disc tray reaches a pull-in completion position.

* * * * *